United States Patent
Yamaguchi et al.

(10) Patent No.: US 6,185,374 B1
(45) Date of Patent: Feb. 6, 2001

(54) MECHANISM FOR CONTROLLING FLASH LIGHT EMISSION, CAMERA WITH THE MECHANISM, AND ITS CONTROL METHOD

(75) Inventors: Motoshi Yamaguchi; Koutaro Kawabe, both of Sakai; Reiji Seki, Tondabayashi; Akihiko Fujino, Sakai, all of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/385,904

(22) Filed: Aug. 30, 1999

(30) Foreign Application Priority Data

Sep. 1, 1998 (JP) .................................................. 10-247285
Sep. 1, 1998 (JP) .................................................. 10-247305

(51) Int. Cl.$^7$ .................................................. G03B 15/05
(52) U.S. Cl. ............................................. 396/61; 396/159
(58) Field of Search ............................. 396/61, 159, 161, 396/157, 233, 234, 225

(56) References Cited

U.S. PATENT DOCUMENTS 5,749,002 * 5/1998 Iwasaki ............................. 396/225 X
5,815,743   9/1998 Ohmori .................................. 396/61
6,035,135 * 3/2000 Okamura .............................. 396/61

FOREIGN PATENT DOCUMENTS 8-178637   7/1996  (JP) .

* cited by examiner

Primary Examiner—W. B. Perkey
(74) Attorney, Agent, or Firm—Sidley & Austin

(57) ABSTRACT

A mechanism, of a camera, to let a light adjustment operation for a flash light be performed with a higher precision in a shorter time. The mechanism includes: a first device for taking an image of a region to be photographed and for outputting image process information; a second device for detecting a main subject region and for detecting a background region on the basis of the image process information, in which the second device outputs main subject information upon the main subject region thus detected and outputs background information upon the background region thus detected; a third device for calculating a compensation value for light adjustment on the basis of the main subject information and on the basis of the background information; and a fourth device for controlling an amount of flash light emission at time of taking a photograph with an emission of the flash light on the basis of the compensation value for light adjustment.

17 Claims, 35 Drawing Sheets

IMAGE INFORMATION

TURNING-OVER INFORMATION

EDGE-DETECTING INFORMATION

COLOR INFORMATION

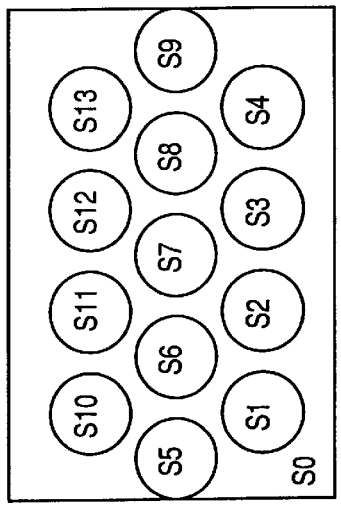
Fig.20(C) PHOTOMETRIC ELEMENT
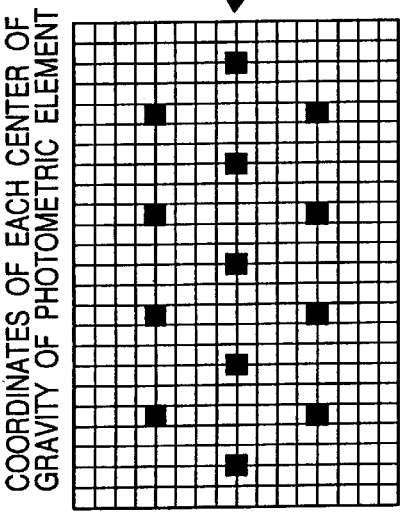
Fig.20(B) COORDINATES OF EACH CENTER OF GRAVITY OF PHOTOMETRIC ELEMENT
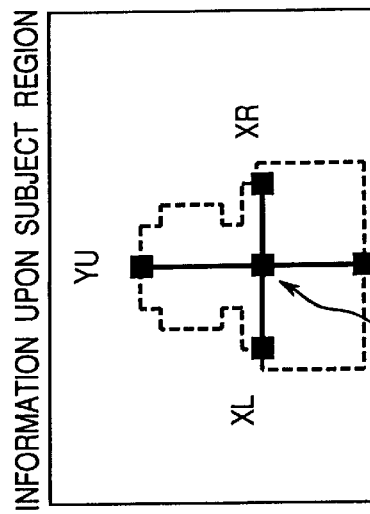
Fig.20(A) INFORMATION UPON SUBJECT REGION
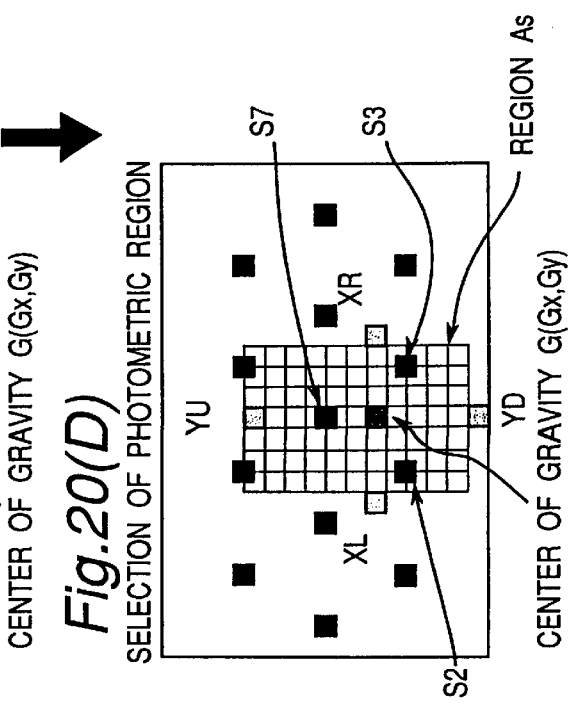
Fig.20(D) SELECTION OF PHOTOMETRIC REGION

INFORMATION UPON SUBJECT REGION

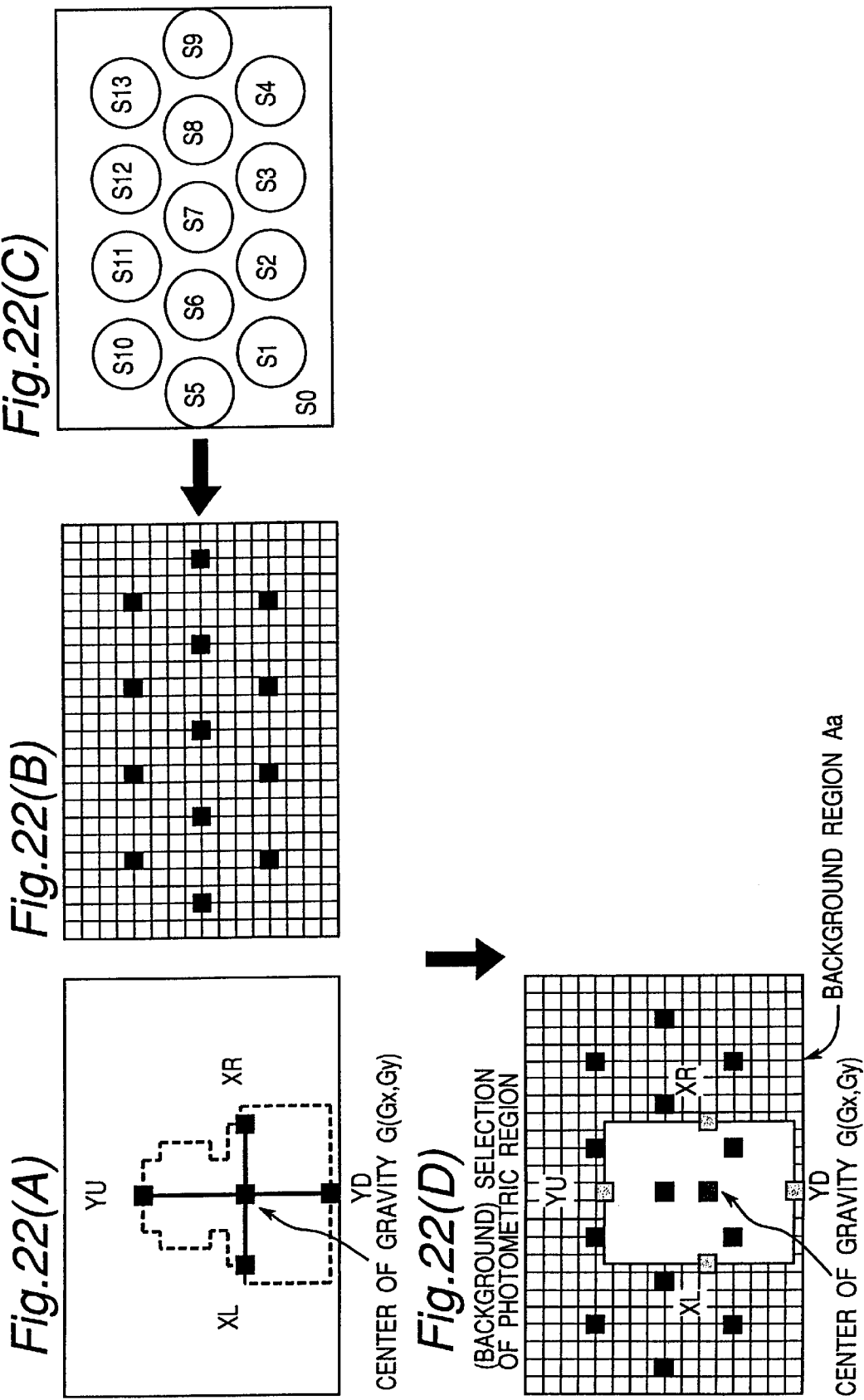

CENTER OF GRAVITY G2    MAIN SUBJECT REGION : As

CENTER OF GRAVITY G2    BACKGROUND REGION : Aa

MECHANISM FOR CONTROLLING FLASH LIGHT EMISSION, CAMERA WITH THE MECHANISM, AND ITS CONTROL METHOD

This application is based upon application Nos. 10-247285 and 10-247305 filed in Japan, the contents of which are hereby incorporated by reference.

BACKGROUND OF THE INVENTION

1. Field of the Invention

The present invention generally relates to a camera, and particularly relates to a mechanism for controlling a flash light emission of the camera. The present invention also relates to a method for controlling the flash light emission.

2. Description of the Related Arts

Conventionally, there have been proposed a variety of cameras each of which is able to photograph a subject (i.e. an object to be photographed) while emitting a flash light from a flash gun of the camera under a condition in which there is set a predetermined contribution rate for each of a plurality of light adjustment fields (or regions) that are formed by dividing a photographing field (or region). According to such a camera, a light adjustment control (or a control of the emission of the flash light) is performed as follows.

That is, as shown in FIG. 3 for example, an OUTPUT DEVICE FOR INFORMATION UPON SUBJECT S2 detects a location of a main subject to be photographed, a distance up to the main subject, a state of the background, and so forth, on the basis of a photometric value which is optically measured by a MULTI-DIVISION PHOTOMETRIC DEVICE S6, and on the basis of a focusing value which is measured by a FOCUSING DEVICE S7, in order to execute the light adjustment control. A CALCULATOR FOR CALCULATING CONTRIBUTION RATE OF LIGHT ADJUSTMENT S3 calculates a contribution rate of light adjustment, for example, on the basis of information upon the main subject detected by the OUPTPUT DEVICE FOR INFORMATION UPON SUBJECT S2, and on the basis of a photometric value which is optically measured by preparatorily making the flash gun emit the flash light by a PREPARATORY LIGHT EMISSION MONITOR S8. A LIGHT ADJUSTMENT CONTROL DEVICE S4 controls a MULTI-DIVISION LIGHT ADJUSTMENT DEVICE S5 on the basis of the contribution rate of light adjustment which is calculated by the CALCULATOR FOR CALCULATING CONTRIBUTION RATE OF LIGHT ADJUSTMENT S3, so that the contribution rate is set for each light adjustment region or field.

According to the mechanism, the light adjustment control is executed by calculating the contribution rate of light adjustment in accordance with a specified algorithm on the basis of the results of photometry (or photometric measuring), focusing operation and preparatory light emission.

However, in order to improve the performance, or ability, of the flash exposure, there is need of increasing the number of light measuring points and/or increasing the number of focusing points and/or complicating the algorithm, so that the time of calculation or operation required for the light adjustment algorithm, and/or the time of control required for the light adjustment, become(s) longer.

On the other hand, conventionally, there have been proposed a variety of cameras in each of which it is possible to take a photograph while making a flash light emit from a flash gun with a state in which the amount of flash light is controlled in accordance with a photographing condition. Such a camera has a construction as follows.

That is, as shown in FIG. 39 for example, an OUTPUT DEVICE FOR INFORMATION UPON SUBJECT POSITION S25 of the camera detects a location of a main subject to be photographed, a distance up to the main subject, a state of the background, and so forth, on the basis of a photometric value which is optically measured by a MULTI-DIVISION PHOTOMETRIC DEVICE S6, and on the basis of a focusing value which is measured by a FOCUSING DEVICE S7. A CALCULATOR FOR CALCULATING COMPENSATION VALUE OF LIGHT ADJUSTMENT S30 detects a compensation value for light adjustment, on the basis of information, detected by the OUTPUT DEVICE FOR INFORMATION UPON SUBJECT POSITION S25, upon the subject to be photographed. A LIGHT ADJUSTMENT CONTROL DEVICE S4 controls an amount of flash light emission, on the basis of the compensation value for light adjustment which is calculated by the CALCULATOR FOR CALCULATING COMPENSATION VALUE OF LIGHT ADJUSTMENT S30.

According to the mechanism, the light adjustment control is executed by calculating the compensation value for light adjustment in accordance with a specified algorithm on the basis of the results of photometry (or photometric measuring) and focusing operation.

However, in order to improve the performance, or ability, of the flash exposure, there is need of increasing the number of light measuring points and/or increasing the number of focusing points and/or making preparatorily the flash light emit from the flash gun, so that the algorithm becomes complicated. Namely, accompanying the complication of the algorithm, the time of calculation or operation required for the light adjustment algorithm, and/or the time of control required for the light adjustment, become(s) longer.

SUMMARY OF THE INVENTION

Accordingly, it is an object of the present invention to provide a camera with a mechanism for controlling a flash light emission in which it is possible to control a light adjustment with a high accuracy in a short time.

It is another object of the present invention to provide a method for controlling the light adjustment.

In order to achieve the above object, according to one aspect of the present invention, there is provided a camera, comprising: an image sensor for sensing, or detecting, an image of a subject to be photographed, and for outputting subject information by processing data of the image; a plurality of light adjustment sensors for receiving a light which reflects from the subject, wherein each of the light adjustment sensors has a light receiving region which corresponds to at least a part of the light, and wherein the light adjustment sensors receive the light when a flash light is emitted; a calculator for calculating a contribution rate of an output supplied from each of the light adjustment sensors, on a basis of the subject information output from the image sensor; and a controller for controlling an emission of the flash light, on a basis of the contribution rate calculated by the calculator.

In the mechanism, the flash light may be emitted by a flash gun, for example, of the camera.

According to the mechanism, it is possible to accurately detect a condition of the subject to be photographed, such as a location, or position, of a main subject, and a relative positional relation between the main subject and its background, on the basis of the data of the image which is processed in the image sensor. Therefore, it is possible to enhance a performance, or ability, to control the flash light emission by accurately calculating the contribution rate relative to the light receiving region of each light adjustment sensor, and/or it is possible to shorten the time which is required to control the light adjustment, for example, by omitting a control of a preliminary flash light emission.

Consequently, according to the mechanism, it is possible to control the light adjustment with a high accuracy in a short time.

The one aspect of the present invention, for example, can be embodied as follows.

That is, as shown in FIG. 1, the image sensor may comprise an IMAGE TAKING DEVICE S1 and an OUTPUT DEVICE FOR INFORMATION UPON SUBJECT S2. In this arrangement, for example, the IMAGE TAKING DEVICE S1 takes in, or senses, an image of the subject to be photographed and outputs the data of the image (for example, image information upon the subject to be photographed, contour detection information, vector detecting information, color information, etc) to the OUTPUT DEVICE FOR INFORMATION UPON SUBJECT S2. The OUTPUT DEVICE FOR INFORMATION UPON SUBJECT S2 outputs subject information on the basis of the data of the image output from the IMAGE TAKING DEVICE S1. The subject information is information upon the condition, or state, of the subject to be photographed, and the subject information includes, for example, information upon: a main subject region in which the main subject exists, where the main subject is a primary subject, or object, to be photographed; a distance up to the main subject; its background; and the like. The subject information is output from the OUTPUT DEVICE FOR INFORMATION UPON SUBJECT S2, on the basis of, for example, the brightness information, contour information, vector information, a combination of the contour information and color information, positional information (for example, central position or not), information upon bright mass (or lump) or upon dark mass (or lump) or upon large mass (or lump) or upon mass (or lump) which locates adjacent to a focussing photometric area or upon mass (or lump) which is moving, or upon the like. The calculator (i.e. CALCULATOR FOR CALCULATING CONTRIBUTION RATE OF LIGHT ADJUSTMENT S3) calculates the contribution rate with respect to the light adjustment region (or the light receiving region) of each of the plurality of light adjustment sensors (i.e. MULTI-DIVISION LIGHT ADJUSTMENT DEVICE S5), on the basis of the subject information which is output from the OUTPUT DEVICE FOR INFORMATION UPON SUBJECT S2. The controller (i.e. LIGHT ADJUSTMENT CONTROL DEVICE S4), for example, sets the contribution rate of the plurality of light adjustment sensors (i.e. MULTI-DIVISION LIGHT ADJUSTMENT DEVICE S5), on the basis of the contribution rate, calculated by the calculator (i.e. CALCULATOR FOR CALCULATING CONTRIBUTION RATE OF LIGHT ADJUSTMENT S3), with respect to the light adjustment region (or the light receiving region) of each of the plurality of light adjustment sensors (i.e. MULTI-DIVISION LIGHT ADJUSTMENT DEVICE S5). That is, the controller controls the flash light emission.

In the mechanism, there may be further provided a light measuring sensor (i.e. MULTI-DIVISION PHOTOMETRIC DEVICE S6) and/or a distance detecting sensor (i.e. FOCUSING DEVICE S7), as shown in FIG. 2.

According to the mechanism, when the condition or state of the subject to be photographed, including, for example, the position of the main subject, or the mutual positional relation between the main subject and the background, or the like, is detected with a high precision on the basis of the data of the image which is output from the IMAGE TAKING DEVICE S1, the photometric value which is output from the light measuring sensor (i.e. MULTI-DIVISION PHOTOMETRIC DEVICE S6) and/or the focussing information which is output from the distance detecting sensor (i.e. FOCUSING DEVICE S7), are/is also employed for the detection thereof. Therefore, the precision to detect the condition, or state, of the subject to be photographed is much higher; as a result, it is possible to calculate the contribution rate of the light adjustment region (or the light receiving region) of each of the plurality of light adjustment sensors (i.e. MULTI-DIVISION LIGHT ADJUSTMENT DEVICE S5), with much higher precision.

Therefore, with the mechanism, it is possible to more enhance a performance, or ability, to control the flash light emission by accurately calculating the contribution rate relative to the light receiving region of each light adjustment sensor, and/or it is possible to more shorten the time which is required to control the light adjustment, for example, by omitting a control of a preliminary flash light emission.

Consequently, according to the mechanism, it is possible to control the light adjustment with a higher accuracy in a shorter time.

In order to achieve the above object, according to another aspect of the present invention, there is provided a method for controlling an emission of flash light, by making use of an image sensor for sensing, or detecting, an image of a subject to be photographed and for outputting subject information by processing data of the image, comprising the steps of: receiving a light which reflects from the subject by a plurality of light adjustment sensors, wherein each of the light adjustment sensors has a light receiving region which corresponds to at least a part of the light, and wherein the light adjustment sensors receive the light when the flash light is emitted; calculating a contribution rate of an output supplied from each of the light adjustment sensors, on a basis of the subject information which is output from the image sensor; and controlling the emission of flash light, on a basis of the contribution rate thus calculated.

In order to achieve the above object, according to still another aspect of the present invention, there is provided a camera comprising: an image sensor for sensing an image of a subject to be photographed, and for outputting subject information by processing data of the image; a calculator for calculating a compensation value for light adjustment, on a basis of the subject information output from the image sensor; and a controller for controlling an emission of the flash light, on a basis of the compensation value for light adjustment calculated by the calculator.

According to the mechanism, the main subject region and the background region can be detected with a high accuracy, on the basis of the subject information which is output from the image sensor, and the compensation value for light adjustment can be calculated and determined on the basis of the information upon the main subject region and the information upon the background region, thus detected.

Therefore, with the mechanism, it is possible to enhance the performance, or ability, of flash exposure (i.e. exposure by making use of a flash light emitted, for example, from a flash gun) in a scene without background and/or in a scene with a background having a relatively higher reflection rate. It is to be noted that it has been conventionally difficult to perform the flash exposure, particularly in such scenes.

Also, with the mechanism, it is possible to shorten the time which is required to control the light adjustment, for example, by omitting a control of a preliminary flash light emission.

Consequently, according to the mechanism, it is possible to control the light adjustment with a high accuracy in a short time.

The still another aspect of the present invention, for example, can be embodied as follows.

That is, as shown in FIG. 37, the image sensor may comprise an IMAGE TAKING DEVICE S1 and an OUTPUT DEVICE FOR INFORMATION UPON SUBJECT S2. In this arrangement, for example, the IMAGE TAKING DEVICE S1 takes in, or senses, an image of the subject to be photographed and outputs the data of the image (for example, image information upon the subject to be photographed, contour detection information, vector detecting information, color information, etc) to the OUTPUT DEVICE FOR INFORMATION UPON SUBJECT S2. The OUTPUT DEVICE FOR INFORMATION UPON SUBJECT S2 outputs subject information on the basis of the data of the image output from the IMAGE TAKING DEVICE S1. The subject information is information upon the condition, or state, of the subject to be photographed, and the subject information includes, for example, information upon: a location of a main subject region in which the main subject exists, where the main subject is a primary subject, or object, to be photographed; a distance up to the main subject (or a distance between the main subject and the camera); a location of a background region in which a background exists; a main background occupation rate (or main background occupation ratio) which designates a rate, or ratio, between the main subject region and the background region; and the like. The calculator (i.e. CALCULATOR FOR CALCULATING COMPENSATION VALUE OF LIGHT ADJUSTMENT S30) outputs the compensation value of light adjustment, on the basis of the subject information which is output from the image sensor (or OUTPUT DEVICE FOR INFORMATION UPON SUBJECT S2). The controller (i.e. LIGHT ADJUSTMENT CONTROL DEVICE S4) sets an amount of flash light emission on the basis of the compensation value of light adjustment which is output from the calculator (i.e. CALCULATOR FOR CALCULATING COMPENSATION VALUE OF LIGHT ADJUSTMENT S30). That is, the controller controls the flash light emission.

In the mechanism, there may be further provided a light measuring sensor (i.e. MULTI-DIVISION PHOTOMETRIC DEVICE S6) and/or a distance detecting sensor (i.e. FOCUSING DEVICE S7), as shown in FIG. 38.

According to the mechanism, for example, when the main subject (or main subject region) and the background (or background region) are detected with a high precision on the basis of the data of the image which is output from the IMAGE TAKING DEVICE S1, the photometric value which is output from the light measuring sensor (i.e. MULTI-DIVISION PHOTOMETRIC DEVICE S6) and/or the focussing information which is output from the distance detecting sensor (i.e. FOCUSING DEVICE S7), are/is also employed for the detection thereof. Therefore, the precision to detect the information upon the main subject (or main subject region) and the information upon the background (or background region) becomes much higher; as a result, the calculator (i.e. CALCULATOR FOR CALCULATING COMPENSATION VALUE OF LIGHT ADJUSTMENT S30) can calculate the compensation value of light adjustment, with much higher precision. Namely, according to the mechanism, the compensation value for light adjustment is determined on the basis of the information upon the main subject (or main subject region) and the information upon the background (or background region), with the higher precision.

Therefore, with the mechanism, it is possible to more enhance the performance, or ability, of flash exposure in the scene in which the background is focussed and/or in the scene with the background having the relatively higher reflection rate.

Also, with the mechanism, it is possible to effectively shorten the time which is required to control the light adjustment, for example, by omitting a control of a preliminary flash light emission.

Consequently, according to the mechanism, it is possible to control the light adjustment with a higher accuracy in a shorter time.

In order to achieve the above object, according to still another aspect of the present invention, there is provided a method for controlling an emission of flash light, by making use of an image sensor for sensing, or detecting, an image of a subject to be photographed and for outputting subject information by processing data of the image, comprising the steps of: calculating a compensation value of light adjustment on a basis of the subject information which is output from the image sensor; and controlling the emission of flash light, on a basis of the compensation value of light adjustment thus calculated.

BRIEF DESCRIPTION OF THE DRAWINGS

These and other objects and features of the present invention will become clear from the following description taken in conjunction with a preferred embodiment thereof with reference to the accompanying drawings, in which:

FIGS. 20(A) through 20(D) are an explanatory view showing a calculation of information upon a subject region if a photometric element (or a photometric sensor), which is mounted independently of the C-MOS image operation processing sensor, is employed;

FIGS. 22(A) through 22(D) are an explanatory view showing a selection of photometric region, if the photometric element, which is mounted independently of the C-MOS image operation processing sensor, is employed, and if an output from the photometric element is used as an photometric value for performing an exposure operation;

DETAILED DESCRIPTION OF THE PREFERRED EMBODIMENT

Figure 1:
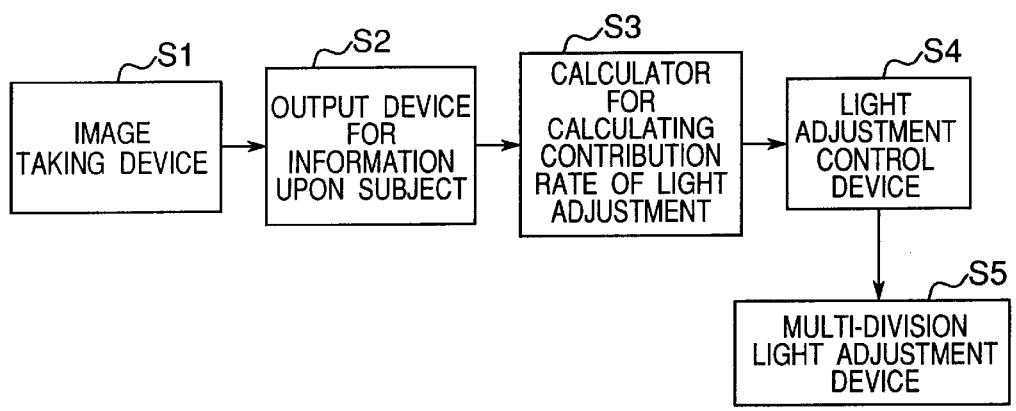
FIG. 1 is a schematic diagram of a camera with a mechanism for controlling a flash light emission according to a first aspect of the present invention.
Figure 2:
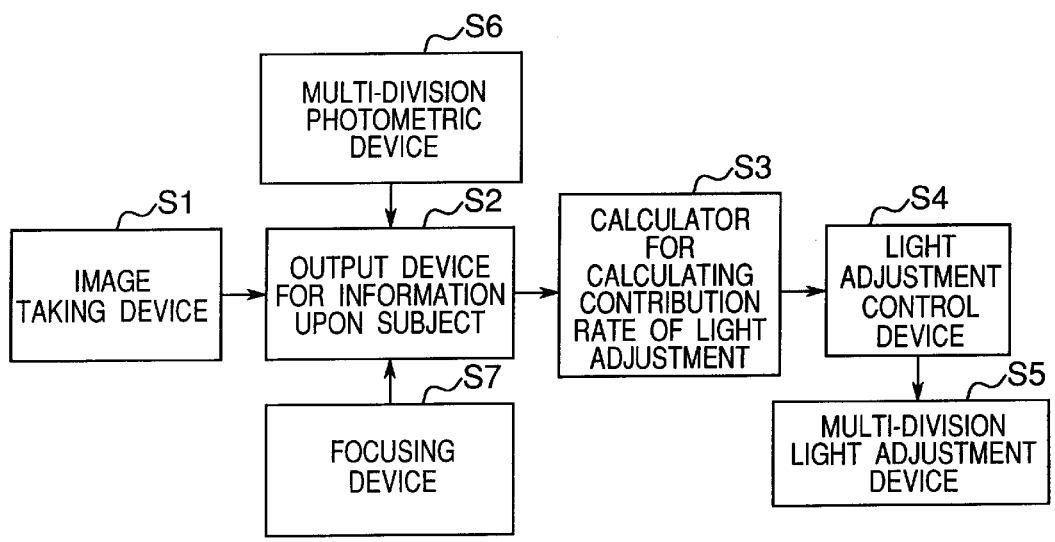
FIG. 2 is a schematic diagram of the camera with the mechanism for controlling the flash light emission according to an second aspect of the present invention.
Figure 3:
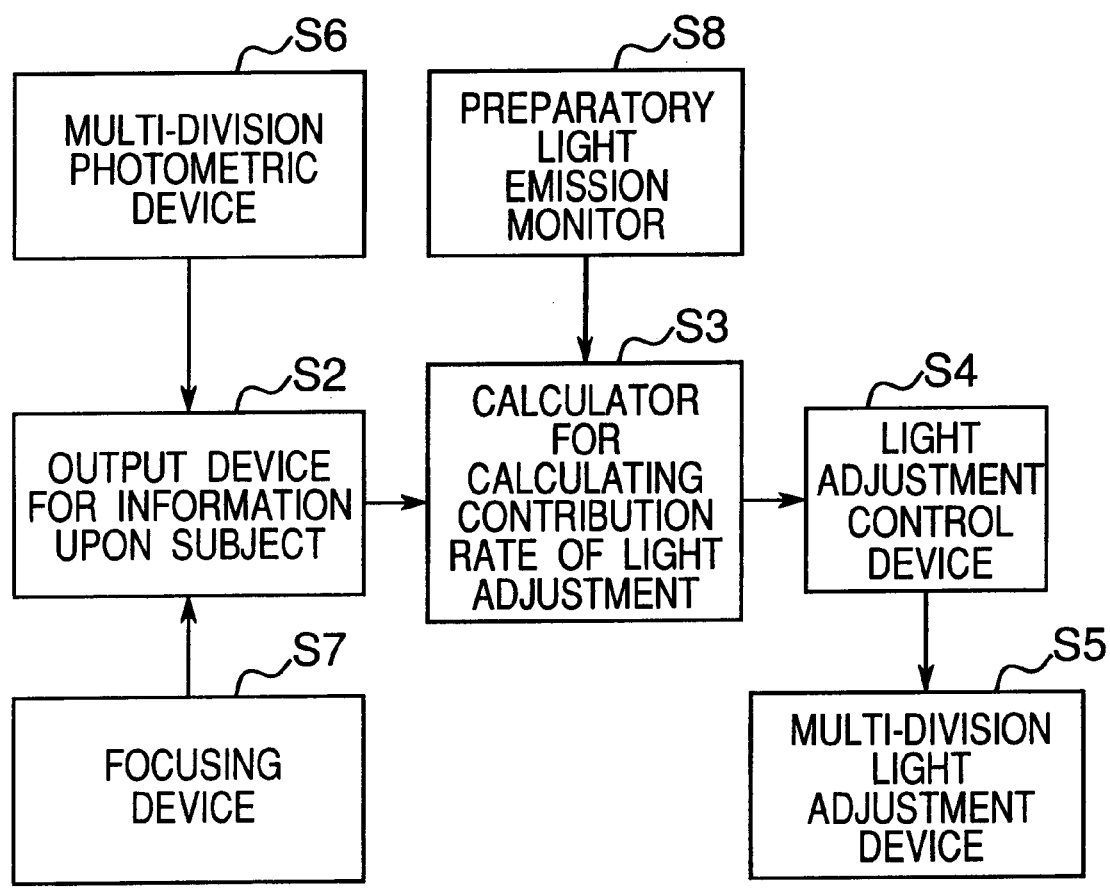
FIG. 3 is a schematic diagram of a camera with a mechanism for controlling a flash light emission according to a prior art.

Before a description of a preferred embodiment according to the present invention proceeds, it is to be noted that like or corresponding parts are designated by like reference numerals throughout the accompanying drawings.

The detailed description is made below upon a camera with a mechanism for controlling a flash light emission, and a method for controlling the flash light emission, according to the preferred embodiment of the present invention with reference to FIGS. 4 through 36.

Figure 4:
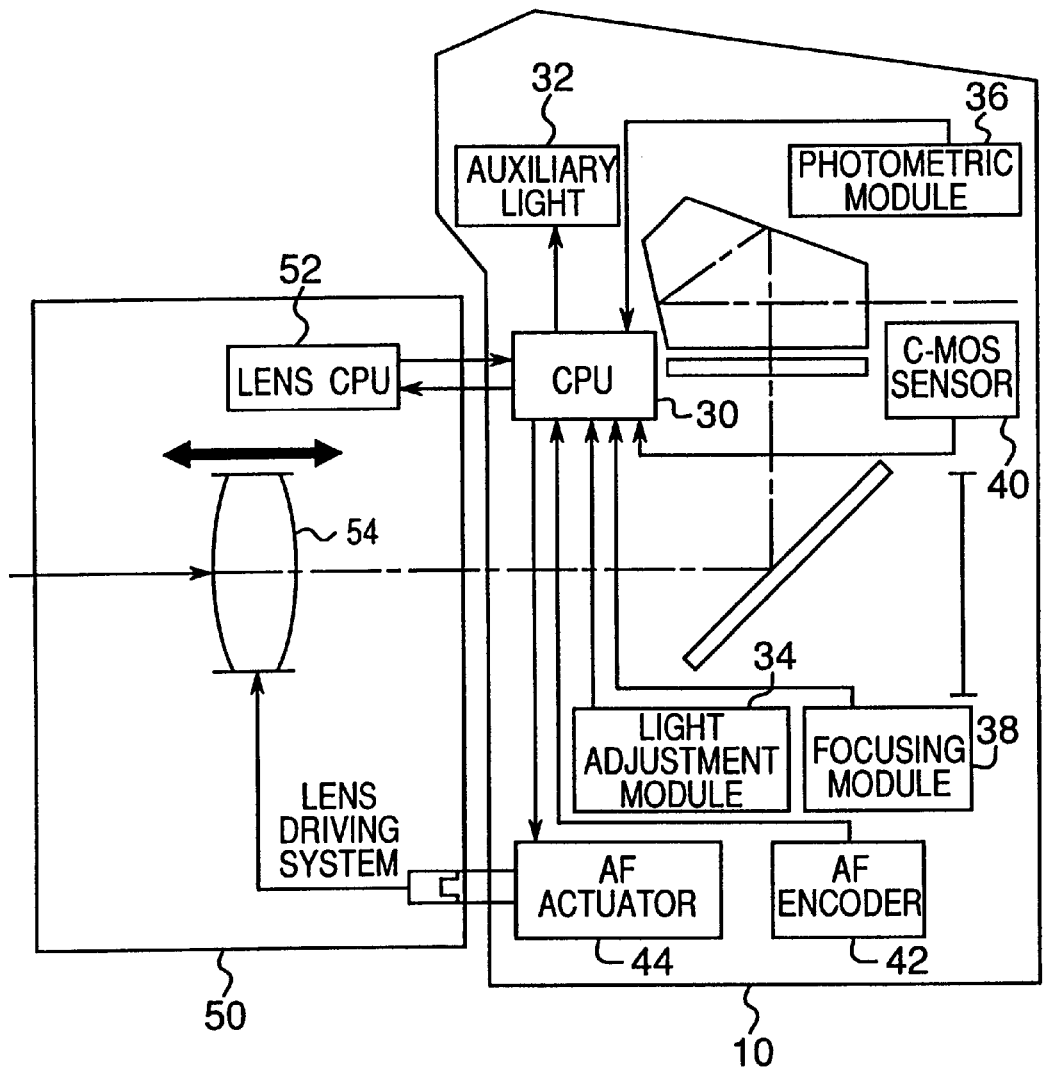
FIG. 4 is a schematic diagram showing a main part of the camera with the mechanism for controlling the flash light emission according to the preferred embodiment of the present invention.

FIG. 4 illustrates a main internal construction of the camera with the mechanism for controlling the flash light emission according to the preferred embodiment.

The camera with the mechanism for controlling the flash light emission has a camera main body 10 which is provided with an auxiliary light emitting section 32, a light adjustment module 34, a photometric module 36, a focusing module 38, a C-MOS image operation processing sensor 40, an AF encoder 42 and an AF actuator 44, each of which is connected to a control microcomputer 30.

The control microcomputer 30 includes a CPU and a memory and totally controls an operation of the camera with the mechanism for controlling the flash light emission. The auxiliary light emitting section 32 emits an auxiliary light. The light adjustment module 34 controls the light emission of the auxiliary light emitting section 32. The photometric module (photometric sensor) 36 measures a brightness of a subject (i.e. an object to be photographed). The focusing module (focusing sensor) 38 measures a distance between the camera and the subject.

The C-MOS image operation processing sensor 40 is arranged so as to take a finder image which is formed at an image-forming position (on a focusing screen locating below a penta-prism) in a finder optical system. More specifically, the C-MOS image operation processing sensor 40 operates so as to take in the image within a region to be photographed by the camera, so as to process the image at a high speed, and so as to output the image processing information upon a shape (or a contour) of the image, and/or upon a movement of the image (i.e. its direction and amount of movement) and so on, to the control microcomputer 30. The C-MOS image operation processing sensor 40 is constituted by a MOS type light-receiving cell able to read image at a higher speed than CCD, and an image calculation operation part for speedily processing the read data and for performing a feature extraction, in which the MOS type light-receiving cell and the image calculation operation part are integrated into one single element. The C-MOS image operation processing sensor 40 has an information compressing function and a parallel processing function, both of which the human retina has. The use of this C-MOS image operation processing sensor 40 enables the image information input device to be improved in function, to be reduced in size (i.e. to be miniaturized), to be increased in speed of operation, and to be reduced in consumption of power. The control microcomputer 30 can execute its control operation at high speed, because the control microcomputer 30 can only process, or manage, data with a small amount of information after the feature extraction.

The AF encoder 42 detects an amount of movement of the AF actuator 44. The AF actuator 44 drives a focus lens in an optical system 54 of an interchangeable lens 50 via a lens drive system of the interchangeable lens 50.

The interchangeable lens 50 is further provided with a lens microcomputer 52, in addition to the optical system 54. The lens microcomputer 52 is connected to the control microcomputer 30 of the camera main body 10, and it performs communication with the control microcomputer 30.

Figure 6:
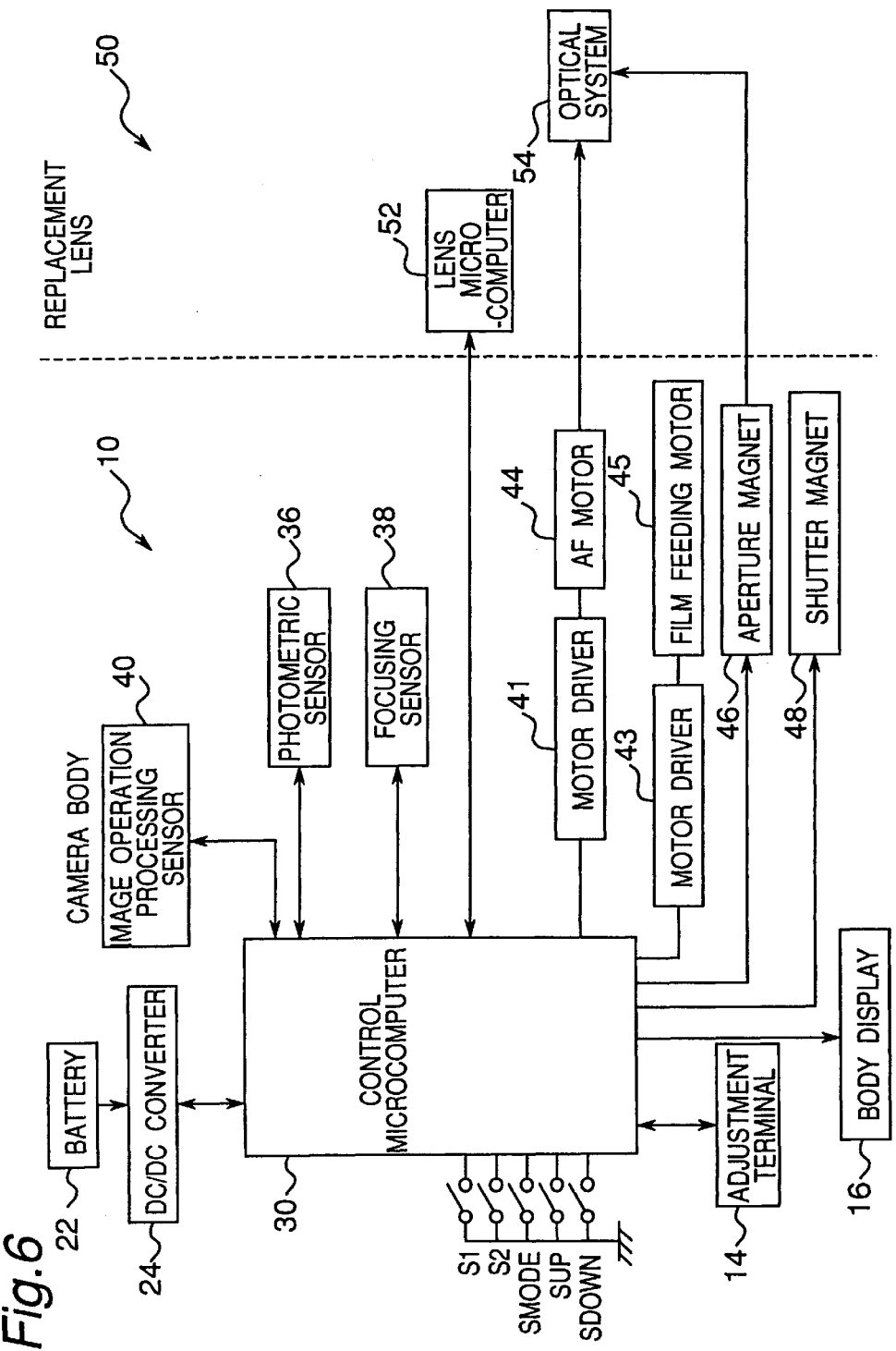
FIG. 6 is a block diagram of the camera with the mechanism for controlling the flash light emission of FIG. 4.

In more detail, the camera with the mechanism for controlling the flash light emission has a construction as shown in a block diagram of FIG. 6.

That is, the camera main body 10 is provided with a DC/DC (DC-to-DC) converter 24, the photometric sensor 36, a focusing sensor 38, the C-MOS image operation processing sensor 40, a pair of motor drivers 41 and 43, an aperture magnet 46, a shutter magnet 48, a body display device 16, an adjustment terminal 14, and various switches S1, S2, SMODE, SUP and SDOWN, each of which is connected to the control microcomputer 30.

The DC/DC converter 24 makes constant a voltage supplied from a battery 22 which is loaded inside the camera main body 10, and it constantly supplies its power to the control microcomputer 30. In the arrangement, when any one of the switches S1, S2, SMODE, SUP and SDOWN is operated, then the DC/DC converter 24 supplies the constant voltage to the various sensors 36, 38 and 40, the motor drivers 41 and 43, the aperture magnet 46, the shutter magnet 48, the body display 16, and the lens microcomputer 52 of the interchangeable lens 50, under the control of the control microcomputer 30.

The motor driver 41 drives the AF motor 44 for moving the focus lens in the interchangeable lens 50, and the motor driver 43 drives the film feeding motor 45 for feeding the film, respectively. The aperture magnet 46 controls, or drives, an aperture for executing the exposure operation. The shutter magnet 48 controls, or drives, the shutter.

The body display device 16 displays a state of the camera, photographing information, and so on. The adjustment terminal 14 is used for adjusting the sensors 36 and 40.

The switch S1 is a switch for executing the photometric measuring, focusing, calculation processing, and AF driving control of the interchangeable lens 50, in order to prepare photographing. The switch S1 is turned on when a shutter button is depressed (i.e. pressed down) halfway. The switch S2 is a switch for executing the exposure operation. The switch S2 is turned on when the shutter button is completely pressed down. The switch SUP and the switch SDOWN are switches for changing a setting value of the shutter speed, and value of the aperture. The switch SMODE is a switch for changing a setting of photographing condition.

The camera with the mechanism for controlling the flash light emission of the present invention is not limited to the construction shown in FIG. 4, and it can be embodied in a variety of forms.

Figure 5:
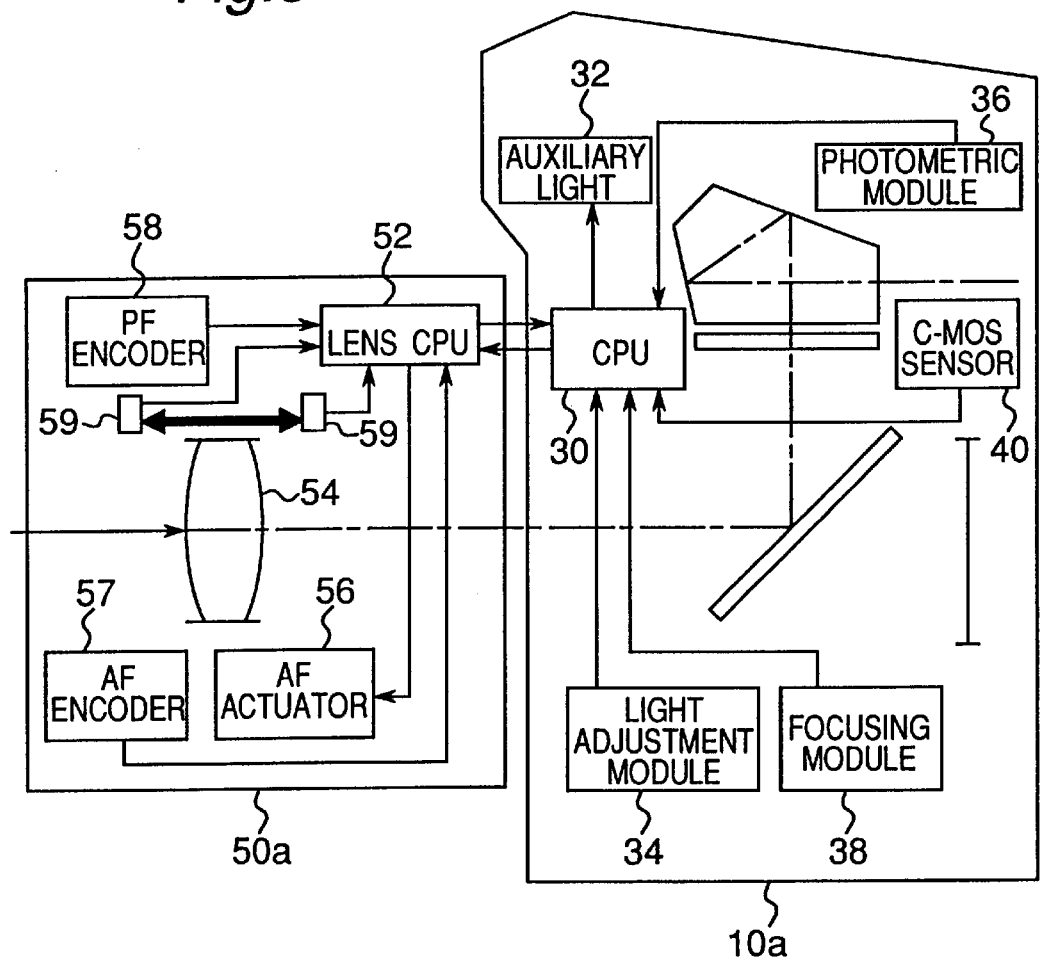
FIG. 5 is a schematic diagram showing a main part of the camera with the mechanism for controlling the flash light emission according to a first modification of the preferred embodiment thereof.

For example, as shown in FIG. 5 which shows a first modification to the preferred embodiment, the camera with the mechanism for controlling the flash light emission may have a construction in which a driving control mechanism of an interchangeable lens 50a is provided inside the interchangeable lens 50a, where the driving control mechanism has an AF actuator 56 for driving the focus lens in the optical system 54, an AF encoder 57 for detecting the driving amount of the AF actuator 56, a PF encoder 58 for detecting a position of the focus lens, and a termination detecting switch 59 for detecting a limit of movement of the focus lens, and where the focus lens in the optical system 54 is driven by communication between a lens microcomputer 52 of the interchangeable lens 50a and the control microcomputer 30 of the camera main body 10.

Figure 7:
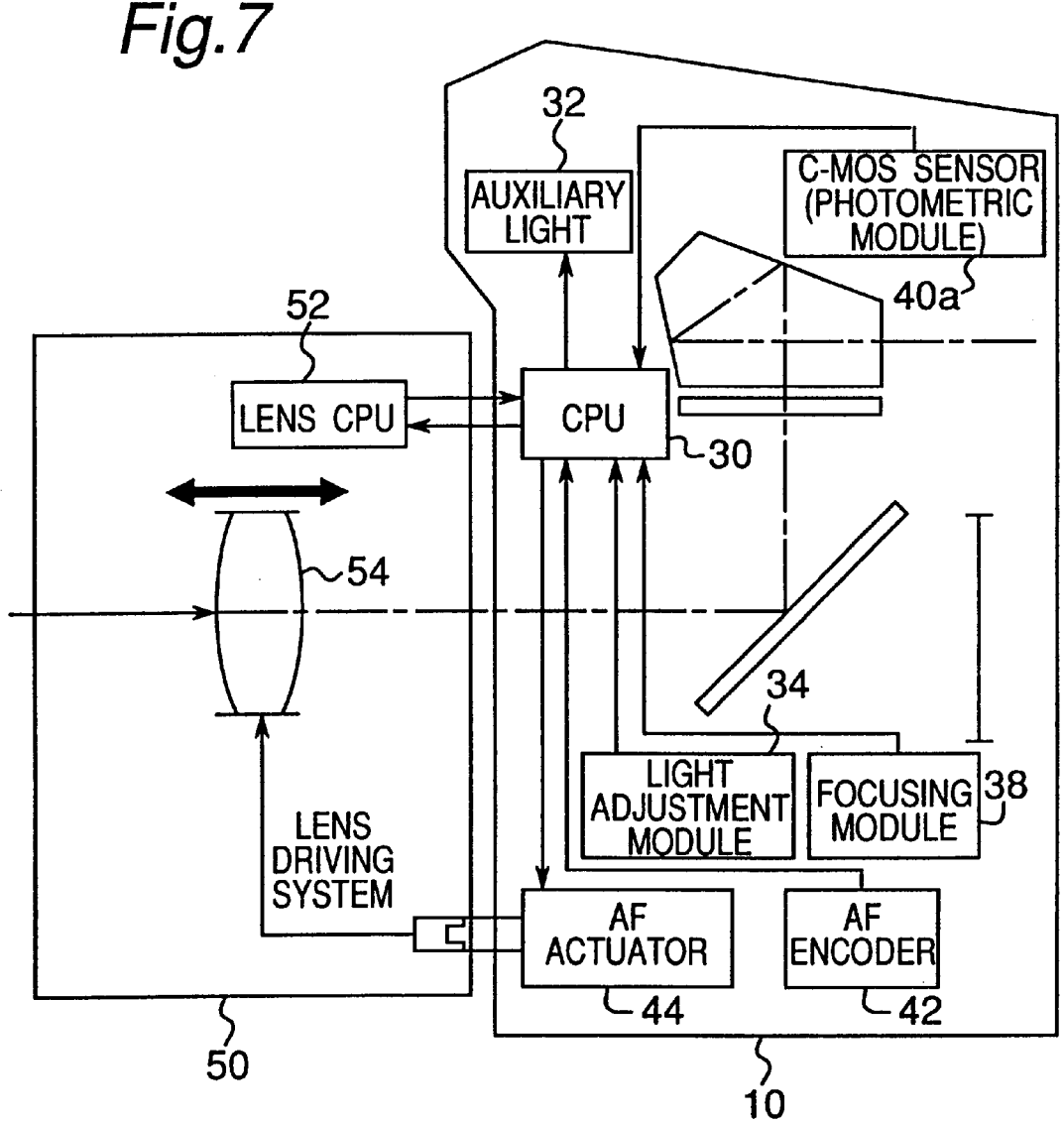
FIG. 7 is a schematic diagram showing a main part of the camera with the mechanism for controlling the flash light emission according to a second modification of the preferred embodiment thereof.
Figure 8:
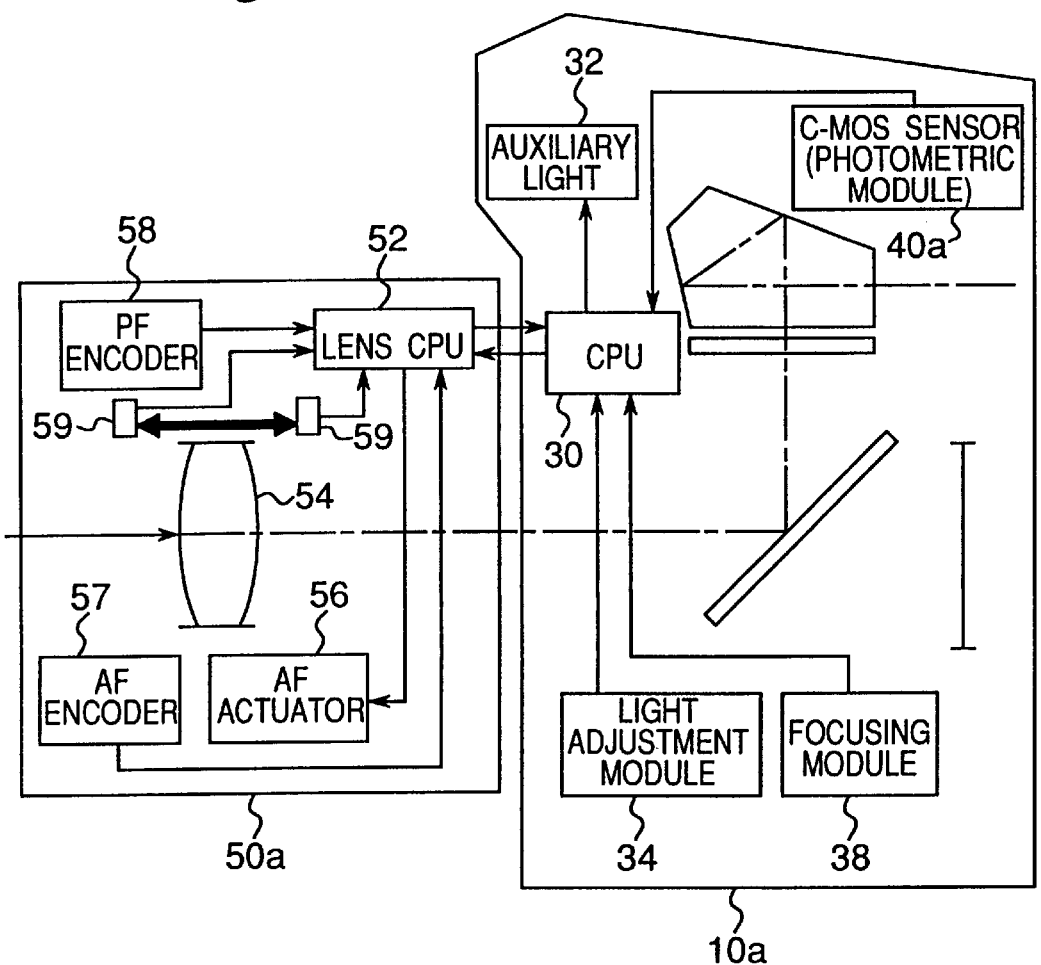
FIG. 8 is a schematic diagram showing a main part of the camera with the mechanism for controlling the flash light emission according to a third modification of the preferred embodiment thereof.

Alternatively, as shown in FIG. 7 which shows a second modification to the preferred embodiment, and as shown in FIG. 8 which shows a third modification thereto, respectively, the photometric module (i.e. photometric sensor) 36 may be cancelled, and the C-MOS image operation processing sensor 40a may also have a function as a photometric.

Figure 9:
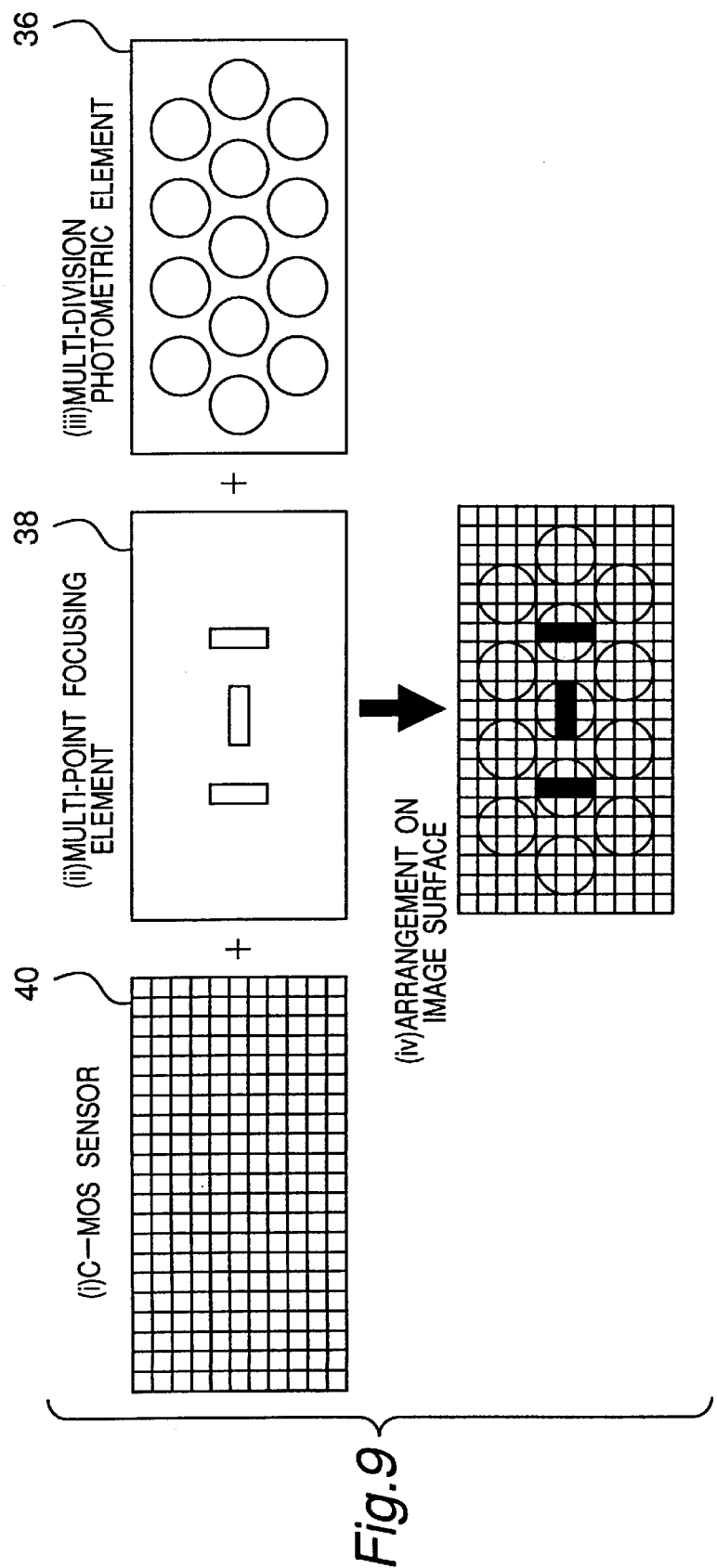
FIG. 9 is an explanatory view which shows an arrangement of a C-MOS image operation processing sensor, a multi-division photometric element and a multi-point focusing element, of the camera with the mechanism for controlling the flash light emission of FIG. 5.
Figure 10:
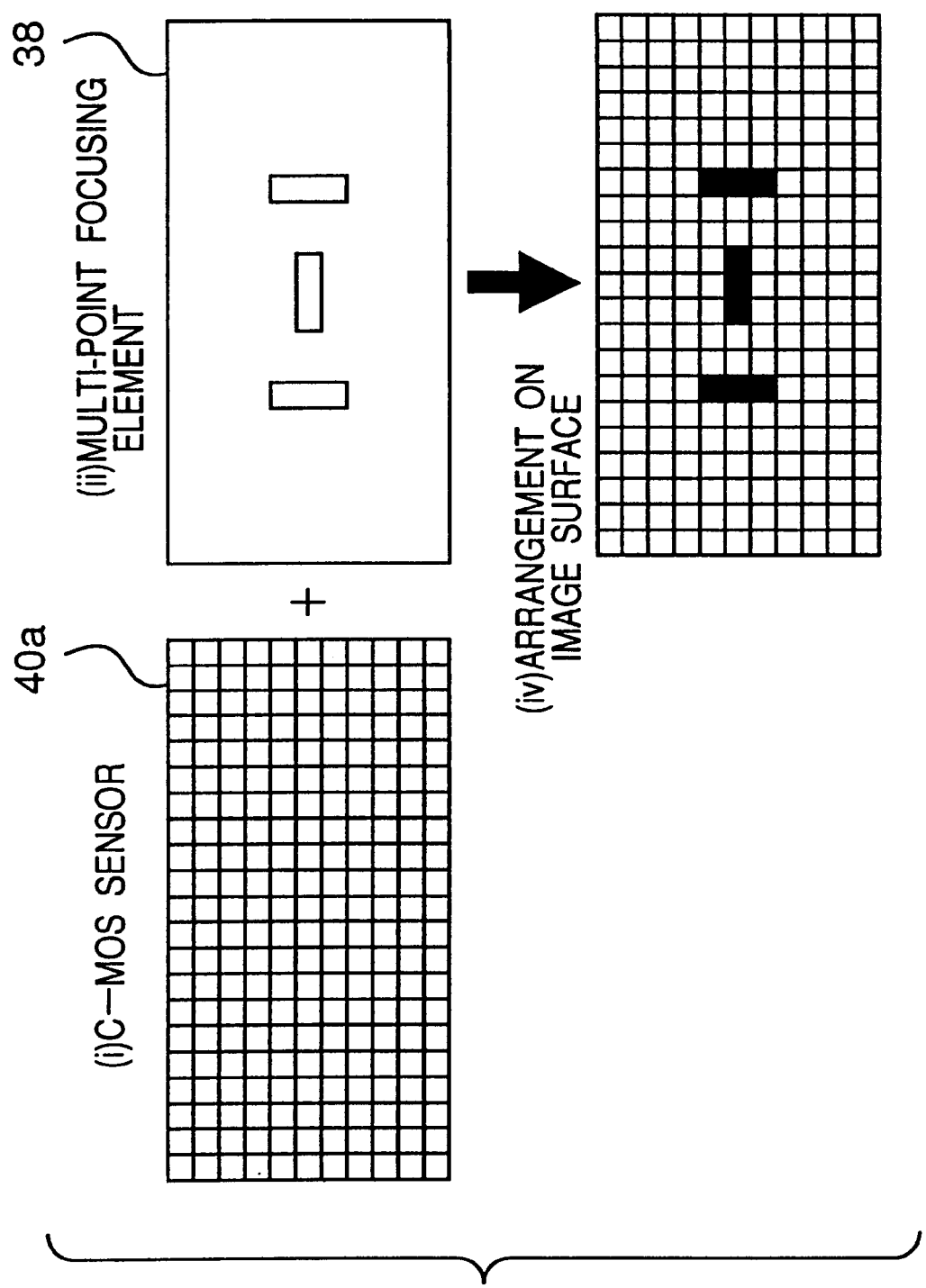
FIG. 10 is an explanatory view which shows an arrangement of the C-MOS image operation processing sensor, and the multi-point focusing element, of the camera with a mechanism for controlling a flash light emission of FIG. 5.
Figure 11:
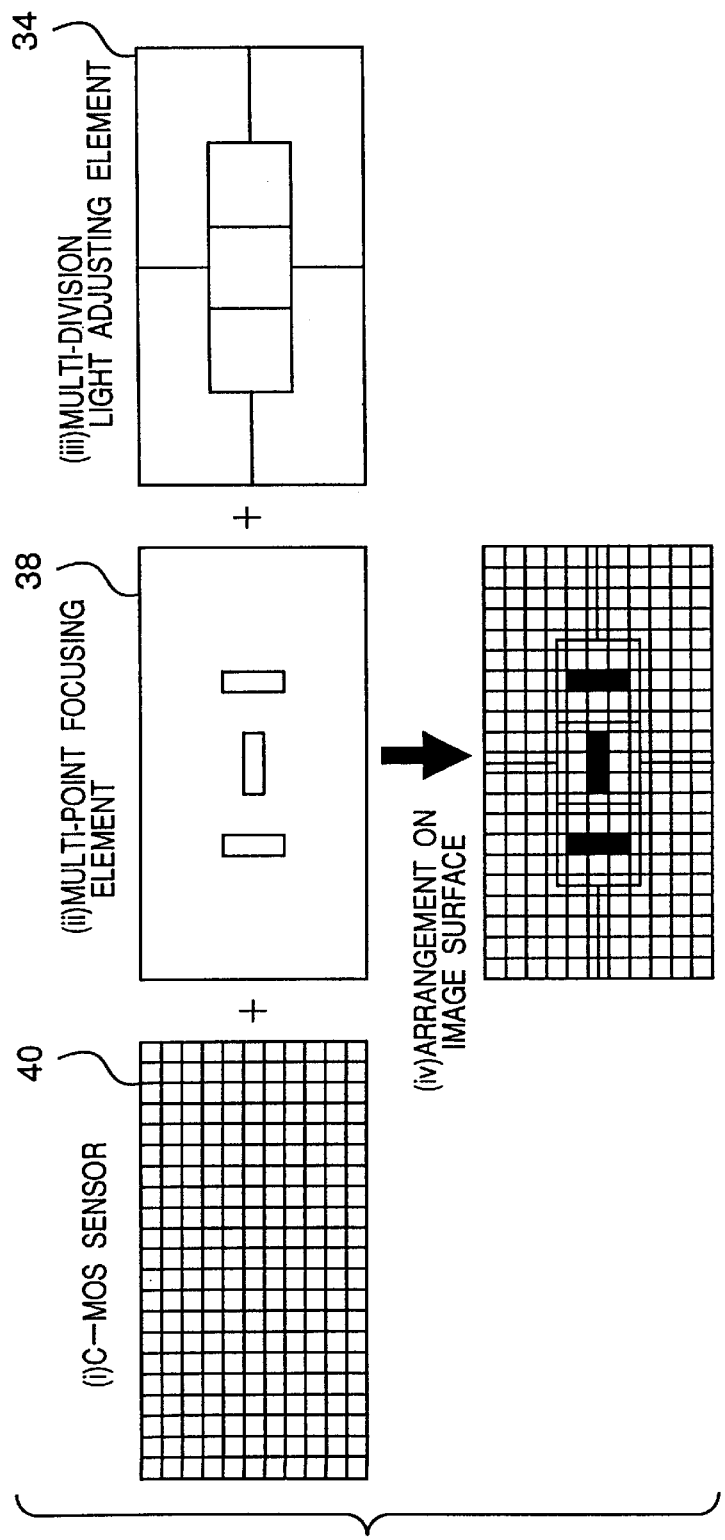
FIG. 11 is an explanatory view which shows an arrangement of the C-MOS image operation processing sensor, a multi-division light adjusting element and the multi-point focusing element, of the camera with the mechanism for controlling the flash light emission of FIG. 5.

In each of the aforementioned cameras with the mechanisms for controlling the flash light emissions, pixels of the C-MOS image operation processing sensor 40, the multi-division photometric element of the photometric sensor 36, and the multi-point focusing element of the focusing sensor 38, have, on a screen, a relative arrangement as shown in FIGS. 9 through 11.

That is, FIG. 9 shows an example, corresponding to FIGS. 4 and 5, in which the C-MOS image operation processing sensor 40, the multi-point focusing element 38, and the multi-division photometric element .36 are combined to each other; on the other hand, FIG. 11 shows an example, corresponding to FIGS. 4 and 5, in which the C-MOS image operation processing sensor 40, the multi-point focusing element 38, and the multi-division light adjusting element 34 are combined to each other. Meanwhile, FIG. 10 shows an example, corresponding to FIGS. 7 and 8, in which the multi-division photometric element of the photometric sensor 36 is eliminated, and an output of the C-MOS image operation processing sensor 40a is also used for photometric measuring. Namely, FIG. 10 shows the example in which the C-MOS image operation processing sensor 40a and the multi-point focusing element 38 are combined to each other.

In each of the aforementioned cameras, the C-MOS image operation processing sensor 40, 40*a* can process the image which has been taken, and it can output a variety of pieces of image processing information as shown in FIGS. 12 through 18.

Figure 12:
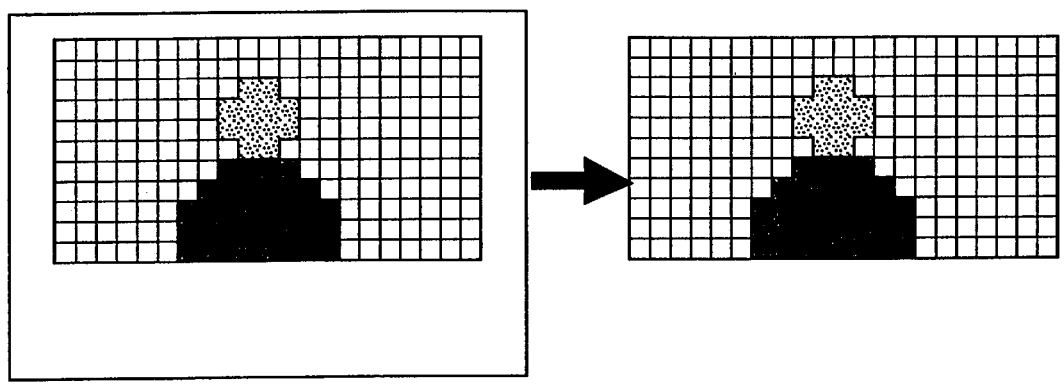
FIG. 12 is an explanatory view which illustrates output information (image information) of the C-MOS image operation processing sensor.

That is, the C-MOS image operation processing sensor 40, 40*a* can output:

(A) image information (see FIG. 12);
(B) turning-over information (see FIG. 13);
(C) edge-detecting (contour detecting) information (see FIG. 14); and
(D) color information (see FIG. 15).

Figure 13:
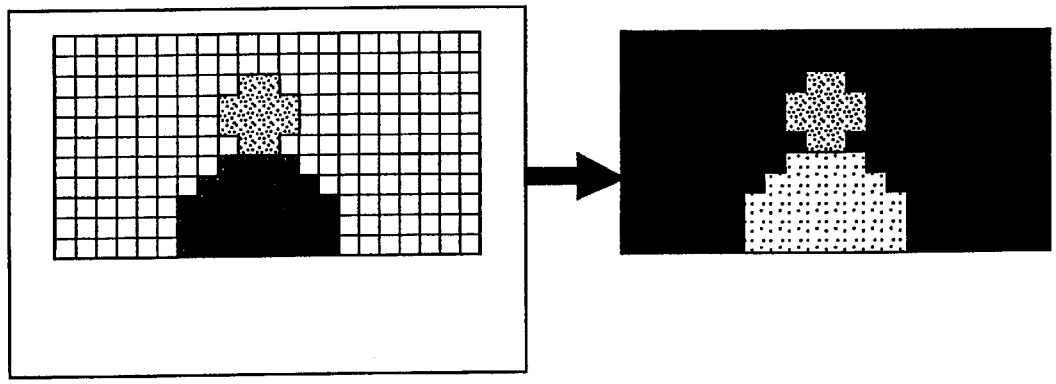
FIG. 13 is an explanatory view which illustrates output information (turning-over information) of the C-MOS image operation processing sensor.
Figure 14:
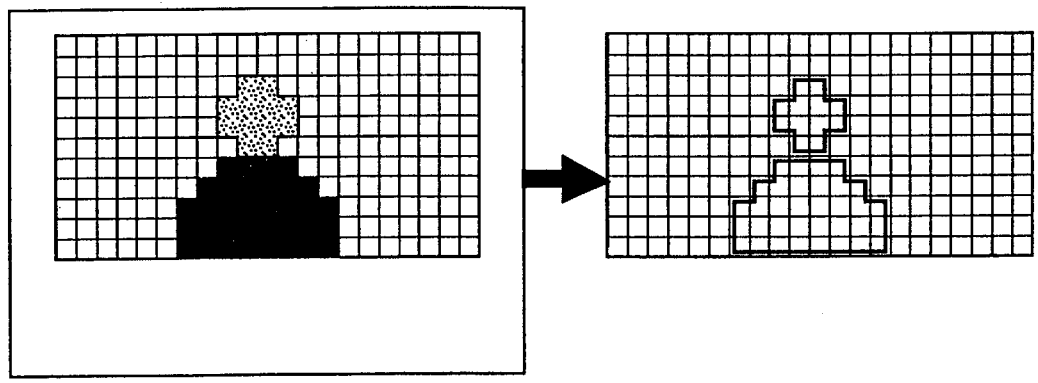
FIG. 14 is an explanatory view which illustrates output information (edge-detection information) of the C-MOS image operation processing sensor.
Figure 15:
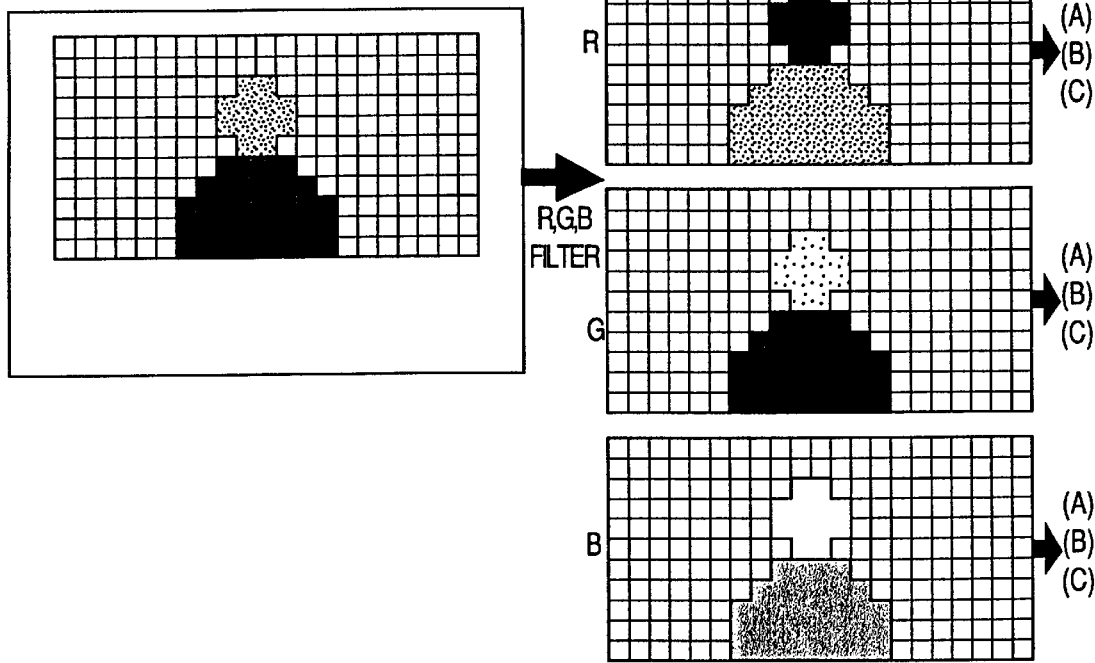
FIG. 15 is an explanatory view which illustrates output information (color information) of the C-MOS image operation processing sensor.

As shown in FIG. 12, the image information is a direct output of the photoelectric output of each pixel. As shown in FIG. 13, the turning-over information is an inverted output of the photoelectric output of each pixel, where it outputs a reference voltage Vref at time of darkness, and the output comes closer to 0 V as brightness increases. As shown in FIG. 14, the edge-detecting information (contour detection information) is an output corresponding to a difference between adjacent pixels, where only the pixels with the difference which is more than a predetermined value can be detected as an edge. As shown in FIG. 15, the color information is the image information upon each component image of R, G and B which is derived from resolving the taken image through an R filter, a G filter and a B filter. Further, the C-MOS image operation processing sensor 40 can output (A) the image information, (B) the turning-over information, and (C) the edge-detecting information, per each component image R, G and B.

Figure 16:
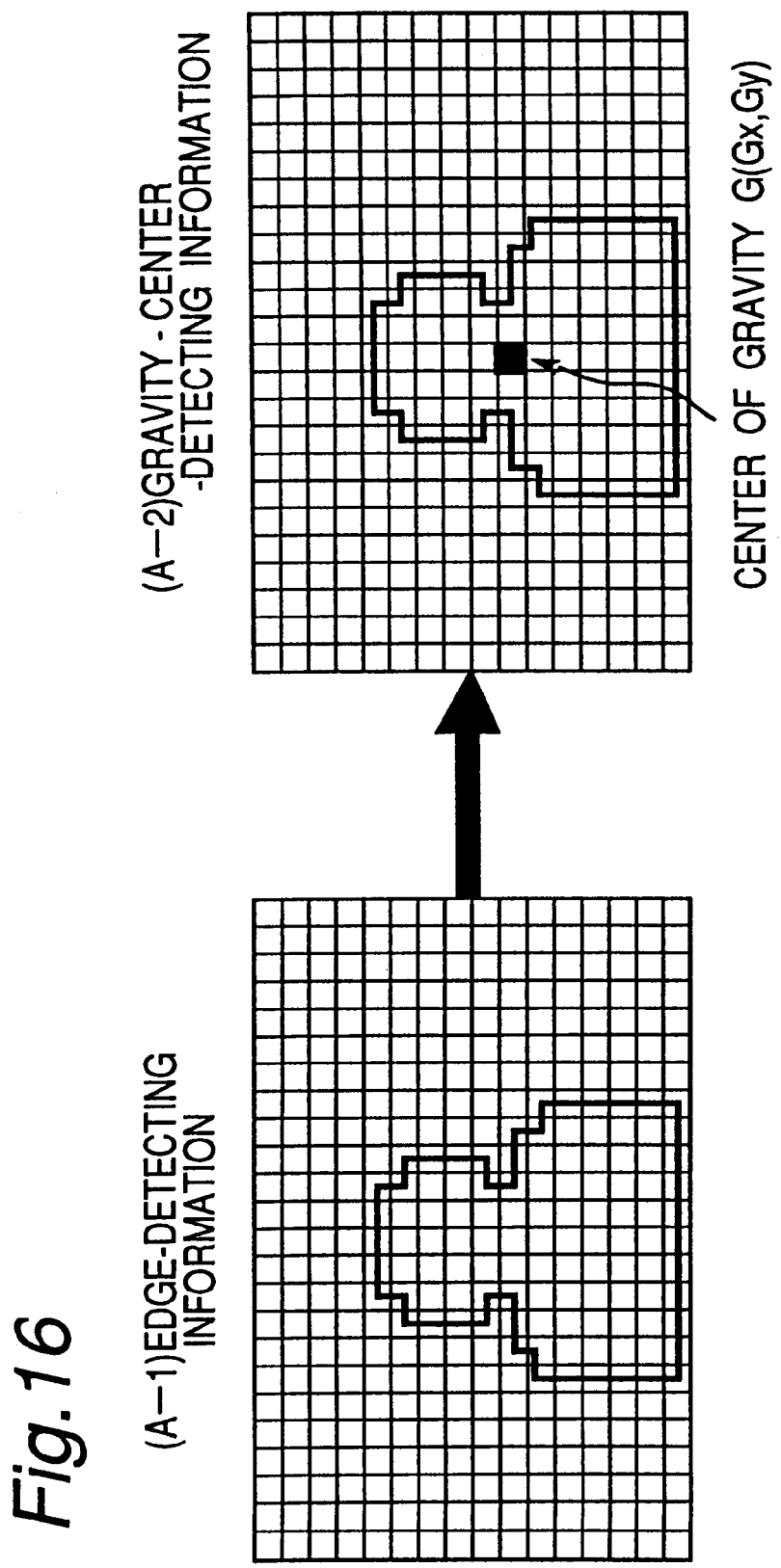
FIG. 16 is an explanatory view showing image processing information (information upon detection of a center of gravity) which is calculated from the output information of the C-MOS image operation processing sensor.
Figure 17:
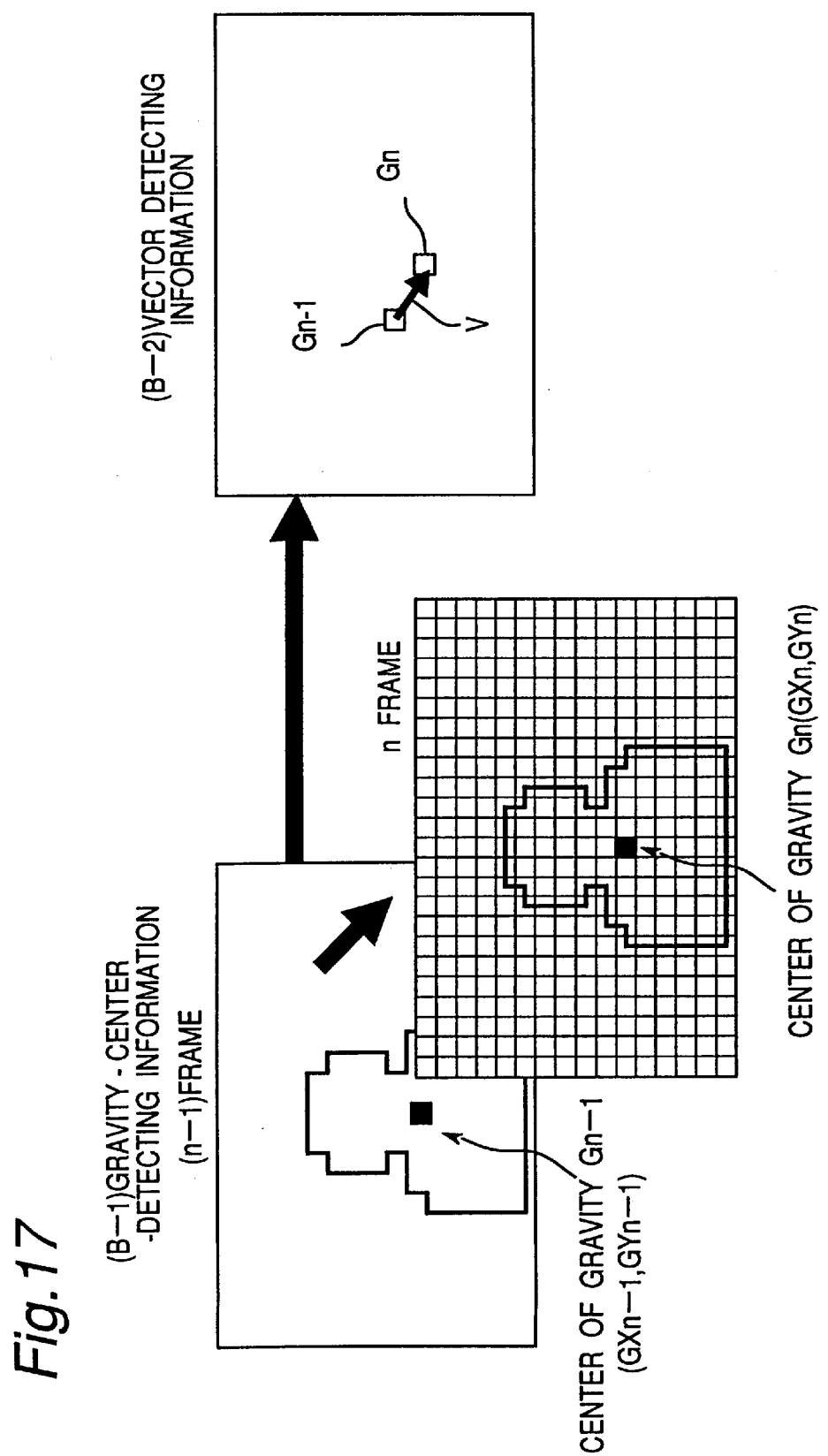
FIG. 17 is an explanatory view showing image processing information (information upon detection of a vector) which is calculated from the output information of the C-MOS image operation processing sensor.
Figure 18:
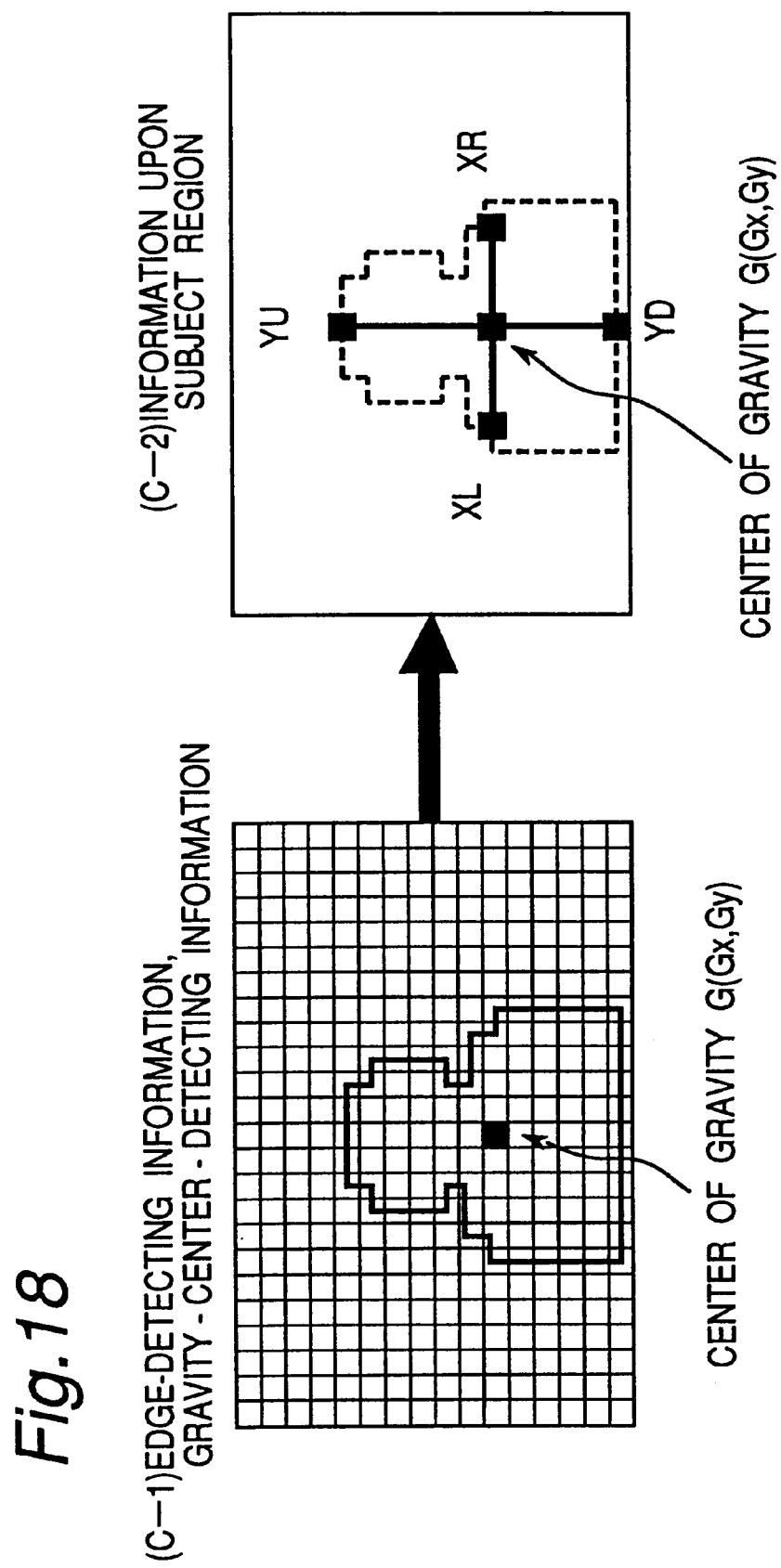
FIG. 18 is an explanatory view showing image processing information (information upon a region of a subject to be photographed) which is calculated from the output information of the C-MOS image operation processing sensor.

As shown in FIGS. 16 through 18, the C-MOS image operation processing sensor 40 can further calculate, and output, a variety of pieces of image processing information, such as gravity-center-detecting information (i.e. information upon detecting a center of gravity), vector detecting information, and information upon subject region, on the basis of the image information, turning-over information, edge-detecting information (contour information), and color information.

The gravity-center-detecting information is obtained on the basis of the coordinates (X1, Y1), (X2, Y2), . . . , (Xk, Yk) of all the pixels (where the total number is assumed to be k) detected as an edge as shown in (A-1), by calculating the coordinates (Gx, Gy) of the center of gravity G according to an equation (Gx, Gy)=((X1+X2+. . . +Xk)/k, (Y1+Y2+. . . +Yk)/k) as shown in (A-2). If there are a plurality of pieces of edge-detecting information, then it is possible to calculate the center of gravity for each of a series of edges.

Meanwhile, the vector detecting information is obtained on the basis of the center of gravity $G_{n-1}(GX_{n-1}, GY_{n-1})$ of the (n−1)-th frame and on the basis of the center of gravity $G_n(GX_n, GY_n)$ of the n-th frame as shown in (B-1), by calculating the movement vector V of the center of gravity as shown in (B-2). That is, vector starting point coordinates: $G_{n-1}$, $(GX_{n-1}, GY_{n-1})$, a direction component: $D(GX_n-GX_{n-1}, GY_n-GY_{n-1})$, and a velocity component: $VG=\{(GX_n-GX_{n-1})^2+(GY_n-GY_{n-1})^2\}^{1/2}/(\text{frame time})$, are calculated. If there are a plurality of edges, it is possible to divide the edges every region, to obtain the center of gravity every divided edge, to obtain the vector information for each divided edge, and to determine the edge having an identical vector direction and velocity as the edge of an identical subject to be photographed.

Meanwhile, the information upon subject region is obtained on the basis of the edge-detecting information and on the basis of the gravity-center-detecting information as shown in (C-1), by calculating the coordinates of the upper, lower, left-hand and right-hand edges, and by calculating the magnitudes in the X- and Y-directions as shown in (C-2). That is, the left-hand edge coordinates $X_L(HX_L, Gy)$ which are located nearest to the center of gravity G and which are located on the left-hand side relative to the center of gravity G where the Y-coordinate of the left-hand edge coordinates $X_L$ is the same as Gy of the center of gravity G(Gx, Gy), the right-hand edge coordinates $X_R(HX_R, Gy)$ which are located nearest to the center of gravity G and which are located on the right-hand side relative to the center of gravity G where the Y-coordinate of right-hand edge coordinates $X_R$ is the same as Gy of the center of gravity G (Gx, Gy), the upper edge coordinates $Y_U(Gx, VY_U)$ which are located nearest to the center of gravity G and which are located on the upper side relative to the center of gravity G where the X-coordinate of the upper edge coordinates Yu is the same as Gx of the center of gravity G (Gx, Gy), and the lower edge coordinates $Y_D(GX, VY_D)$ which are located nearest to the center of gravity G and which are located on the lower side relative to the center of gravity where the X-coordinate of the lower edge coordinates $Y_D$ is the same as Gx of the center of gravity G(Gx, Gy), are calculated, respectively. On the other hand, the magnitude Lx in the X-direction is calculated by $Lx=|HX_R-HX_L|$, and the magnitude Ly in the Y-direction is calculated by $Ly=|VY_D-VY_U|$. If there are a plurality of pieces of edge-detecting information and gravity-center-detecting information, then the information upon subject region may be calculated per each center of gravity.

Next, an algorithm for selecting the photometric region by making use of the information upon subject region, will be described below.

Firstly, an algorithm for selecting the photometric region with respect to a main subject region As, will be described.

Figure 19C:
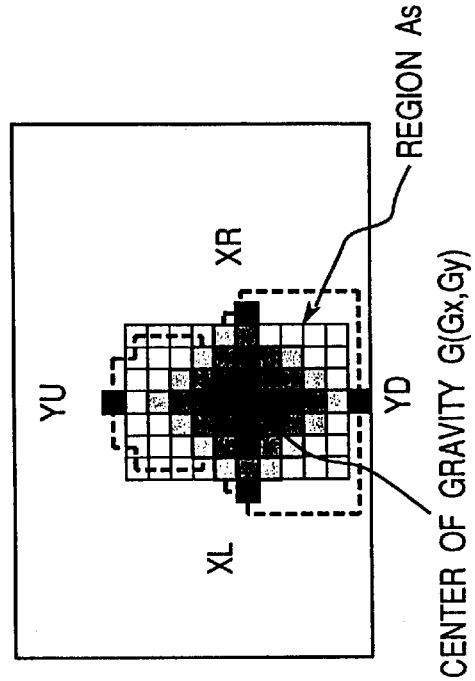
FIGS. 19(A) through 19(C) are an explanatory view showing a calculation of information upon a subject region.
Figure 19A:
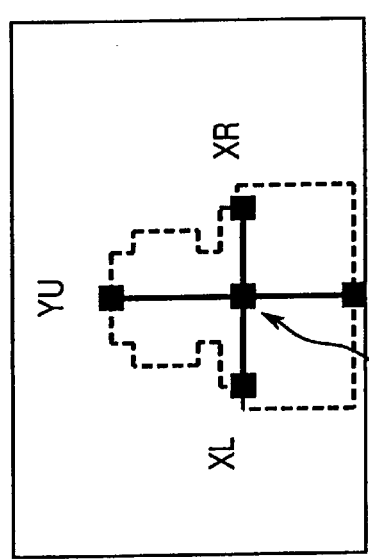
Figure 19B:
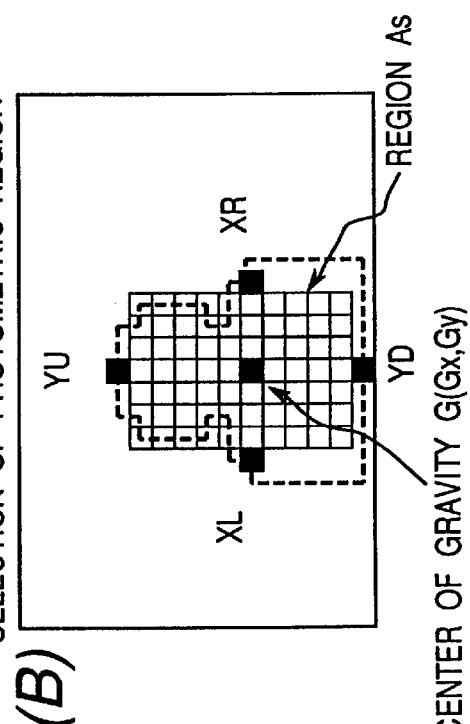

For example, if the image data (photometric output) from the C-MOS image operation processing sensor 40*a* is directly used as the photometric value for the exposure operation as performed in the camera shown in FIG. 7 or FIG. 8, then a rectangular region surrounded by the left-hand edge coordinate $X_L$, the right-hand edge coordinate $X_R$, the upper edge coordinate $Y_U$, and the lower edge coordinate $Y_D$ shown in FIG. 19(A), is selected as the main subject region As, as shown in FIG. 19(B). Then, the photometric output of the pixels included in the main subject region As, among the pixels of the C-MOS image operation processing sensor 40, is directly used as the photometric value for performing the exposure operation. In this case, the weight of the pixels located near the center of gravity G(Gx, Gy) of the subject region As may be increased, as shown in FIG. 19(C).

Meanwhile, for example, if the photometric value which is obtained by the photometric element of the photometric sensor 36 provided separately, or independently, from the C-MOS image operation processing sensor 40, is used as the photometric value for performing the exposure operation as performed in the camera shown in FIG. 4 or FIG. 5, then the main subject region As is sought, similarly to the aforementioned manner, from the information upon subject region, and the output from the photometric elements S2, S3 and S7 locating within the main subject region as is used as a photometric value for executing the exposure operation, as shown in FIGS. 20(A) through 20(D). In this case, it is possible to obtain the brightness of the main subject by simply averaging the photometric outputs of the selected photometric devices S2, S3 and S7, or to obtain the brightness of the main subject by weighting similarly to the arrangement shown in FIG. 19(C), for example.

Next, an algorithm for selecting the photometric region with respect to a background region Aa, will be described below.

Figure 21C:
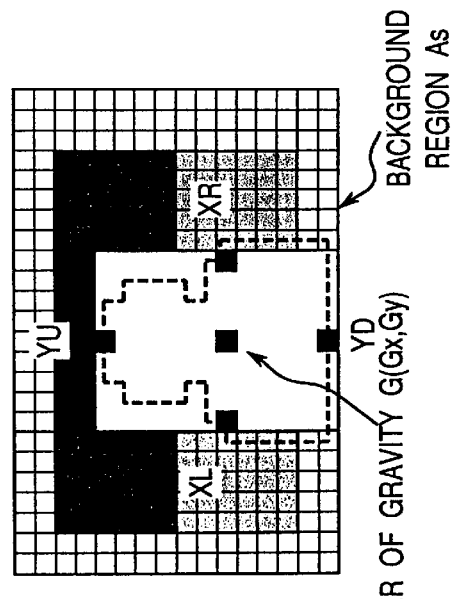
FIGS. 21(A) through 21(C) are an explanatory view showing a selection of photometric region, if the photometric element is not employed, and if an output from the C-MOS image operation processing sensor is used as an photometric value for performing an exposure operation.
Figure 21A:
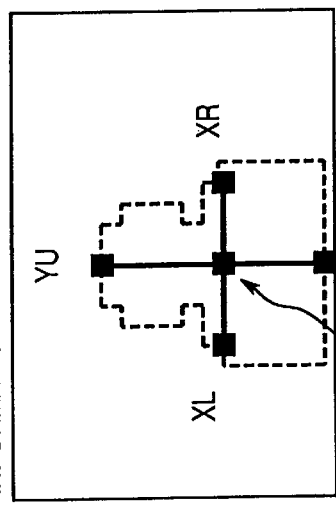
Figure 21B:
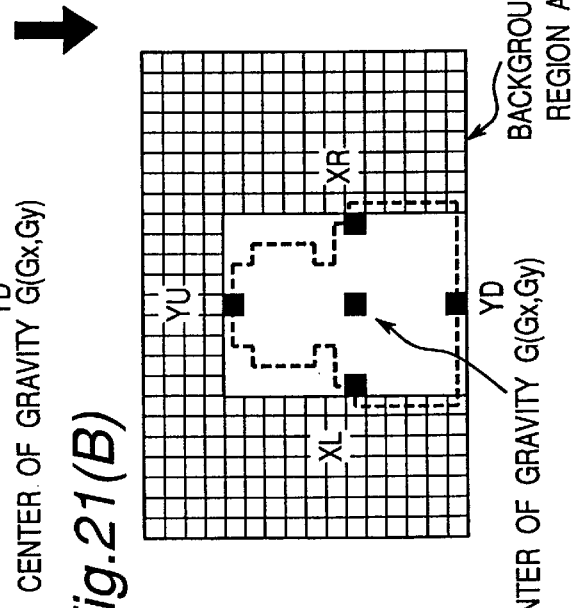

For example, if the image data (photometric output) from the C-MOS image operation processing sensor 40a is directly used as the photometric value for the exposure operation as performed in the camera shown in FIG. 7 or FIG. 8, then a region outside a rectangular region (see FIG. 21(B) or FIG. 21(C)) that includes the edge coordinates $X_L$, $X_R$, $Y_U$ and $Y_D$, is selected as a background region Aa by making use of the edge coordinates $X_L$, $X_R$, $Y_U$ and $Y_D$ of the subject region as shown in FIG. 21(A). In the arrangement, it is possible to treat all the pixels included in the background region Aa with the same weight as shown in FIG. 21(B), or to treat the pixels included therein with different weights in accordance with the positions of the pixels or with the outputs of pixels as shown in FIG. 21(C).

Meanwhile, for example, if the photometric value which is obtained by the photometric element of the photometric sensor 36 provided separately, or independently, from the C-MOS image operation processing sensor 40, is used as the photometric value for performing the exposure operation as performed in the camera shown in FIG. 4 or FIG. 5, then, photometric elements S0, S1, S4 through S6, and S8 through S13, locating within the region Aa that is outside a rectangular region, which includes a plurality of edge coordinates $X_L$, $X_R$, $Y_U$ and $Y_D$ and is surrounded by the plurality of edge coordinates $X_L$, $X_R$, $Y_U$ and $Y_D$ of the subject region, are selected as the photometric elements in the background region Aa, as shown in FIGS. 22(A) through 22(D). It is possible to determine the background brightness by processing the photometric output of the photometric element selected as the photometric region with the same weight, or to change the weight of each photometric element, similarly to the arrangement as shown in FIG. 21(C).

Next, an algorithm for selecting the photometric region by making use of focusing information, will be described below.

Figure 23A:
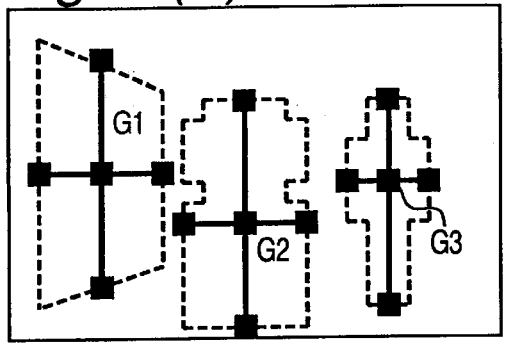
FIGS. 23(A) through 23(E) are an explanatory view for selecting a photometric region by also making use of information upon distance, if the photometric element is not employed, and if the output from the C-MOS image operation processing sensor is used as the photometric value for performing an exposure operation.
Figure 23B:
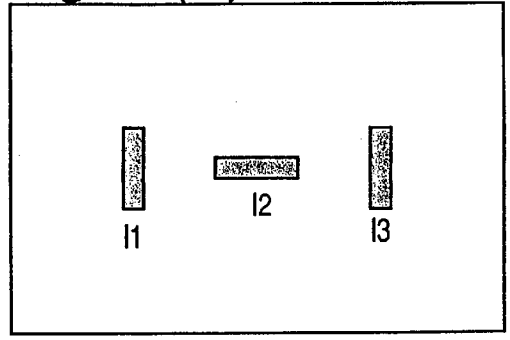
Figure 23C:
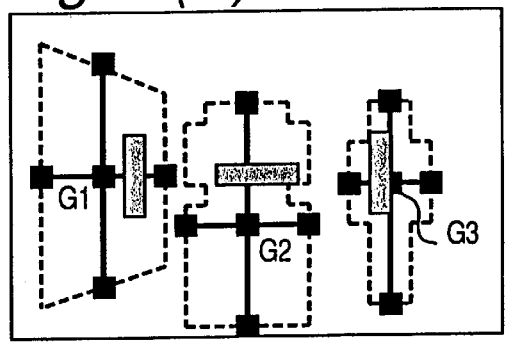

For example, if the image data (photometric output) from the C-MOS image operation processing sensor 40a is directly used as the photometric value for the exposure operation as performed in the camera shown in FIG. 7 or FIG. 8, then, a main subject region As is determined on the basis of a mutual positional relation between information upon a subject region and a focusing region (i.e. focal islands I1 through I3), as shown in FIGS. 23(A) through 23(C).

Figure 23D:
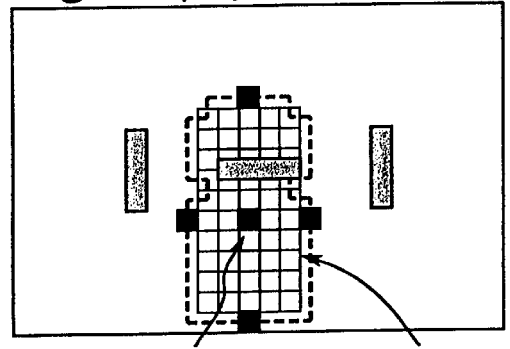

That is, a focal island that the focusing value is equal to the focal distance, or a subject region having a center of gravity which is closest to the nearest island with the smallest focusing value, is selected as the main subject region As. For example, assuming that the focal island I2 is the nearest island as shown in FIG. 23(D), then the edge region having a center of gravity G2 is determined as the main subject region As. Also, the main subject region As may be selected and determined by incorporating brightness information to this. For example, if a periphery of the center of gravity G2 has an excessively low or high brightness, then the edge region having the center of gravity G2 is not selected as the main subject region.

Figure 23E:
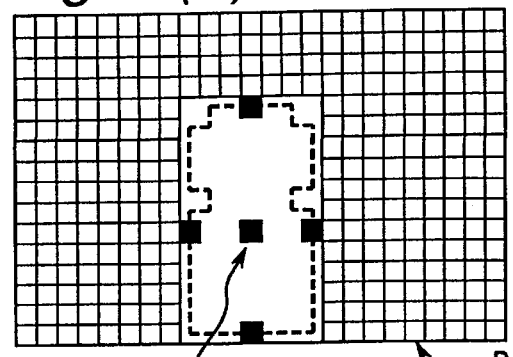

Further, as shown in FIG. 23(E), a region which includes the islands I1 and I3 except the nearest island I2 and which is located outside the main subject region as, is selected as a background photometric region Aa. Subsequently, the exposure operation is executed on the basis of the photometric output of the pixels which are included in the main subject photometric region As and in the background region Aa, similarly to the aforementioned procedure.

Meanwhile, for example, if the photometric value which is obtained by the photometric element of the photometric sensor 36 provided separately, or independently, from the C-MOS image operation processing sensor 40, is used as the photometric value for performing the exposure operation as performed in the camera shown in FIG. 4 or FIG. 5, the same procedure, or operation, is carried out.

An algorithm for calculating a main subject brightness, when a plurality of main subject regions exist, by setting a degree of priority to the regions, will be described below.

Figure 24A:
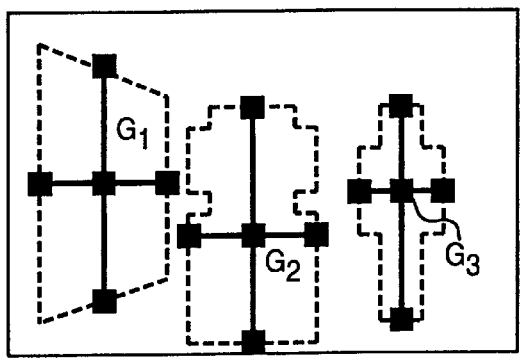
FIGS. 24(A) through 24(D) are an explanatory view showing a selection of photometric region if there exist a plurality of subject regions.
Figure 24B:
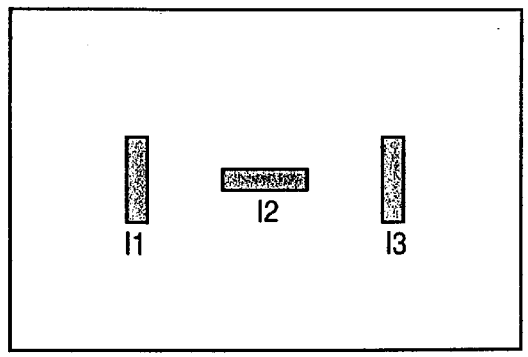
Figure 24C:
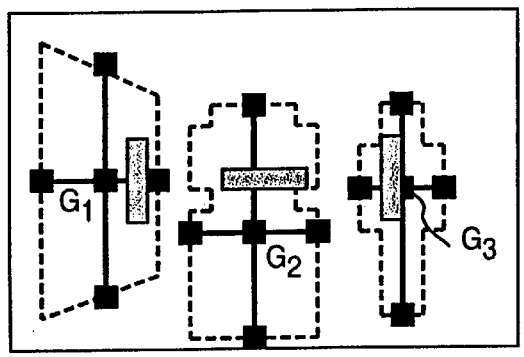
Figure 24D:
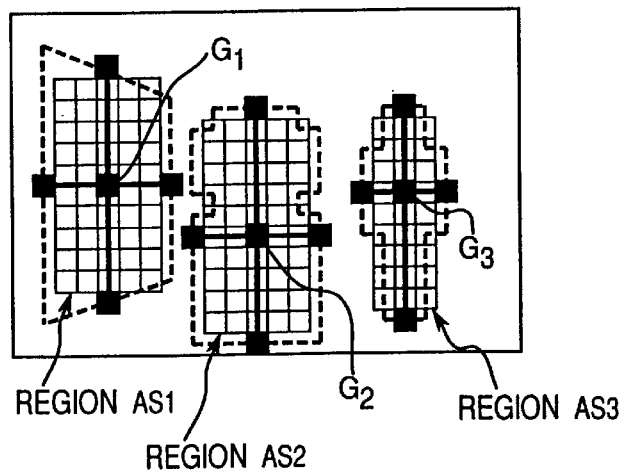

If the image data (photometric output) from the C-MOS image operation processing sensor 40a is directly used as the photometric value for the exposure operation as performed in the camera shown in FIG. 7 or FIG. 8, if the information upon subject regions of FIG. 24(A) and the focal islands I1 through I3 of FIG. 24(B) have a mutual relation as shown in FIG. 24(C), namely if there are a plurality of candidate regions one of which can be a main subject, then, photometric regions AS1, AS2 and AS3 of the candidate regions are set, as shown in FIG. 24(D), similarly to the above. Then, the degrees of priority P1, P2 and P3 of the photometric regions AS1, AS2 and AS3 are specifically set.

For example, the focal island, or the region having a center of gravity closest to the nearest island, is selected as the main subject region of the first priority as the highest priority. More specifically, for example, if the focal island I2 is the nearest island, the edge region having the center of gravity G2 is regarded as the main subject, and the degree of priority P2 of the photometric region AS2 is set to five, for example. Relative to the photometric regions AS1 and AS3 having the other centers of gravity G1 and G3 are set degrees of priority in the order of increasing distance up to the subject, on the basis of the focusing values of the islands I1 and I3. For example, if the distance up to the subject decreases in the order of the photometric regions AS2, AS3 and AS1, then the degree of priority P3 of the photometric region AS3 is set to three, and the degree of priority P1 of the photometric region AS1 is set to one. In this relation, the degree of priority P1 through P3 is assumed to have a higher order (i.e. a higher degree of priority) as the number of the degree of priority P1 through P3 increases.

Alternatively, the degree of priority may be determined according to another method of determination. For example, the degree of priority of each region may be set to be higher in the order of increasing the distance up to the nearest region AS2.

A brightness BVS of the main subject is calculated in accordance to the following equation on the basis of the photometric output of the pixels included in the photometric regions AS1 through AS3 and on the basis of the degrees of priority P1 through P3 of the photometric regions.

$$BVS = \frac{\overbrace{\sum_{k=1}^{n1} P1 * BV_{AS1}k}^{\text{Brightness of Region As1}} + \overbrace{\sum_{i=1}^{n2} P2 * BV_{AS2}i}^{\text{Brightness of Region As2}} + \overbrace{\sum_{j=1}^{n3} P3 * BV_{AS3}j}^{\text{Brightness of Region As3}}}{P1*n1 + P2*n2 + P3*n3} \quad \text{[Equation 1]}$$

where n1 is the number of pixels included in the region AS1, n2 is the number of pixels included in the region AS2, n3 is the number of pixels included in the region AS3, $BV_{AS1}k$ is the photometric output of the k-th pixel in the region AS1, $BV_{AS2}i$ is the photometric output of the i-th pixel in the region AS2, and $BV_{AS3}j$ is the photometric output of the j-th pixel in the region AS3.

By the way, if the degrees of priority of all the subject regions are made equal to one another (for example, if P1=P2=P3=1), then the calculation is to be executed with the weights of the regions being equalized. Through this calculation, the operation is simplified.

Next, a case where the degrees of priority other than the highest degree of priority are determined by incorporating a variety of factors will be described below.

First of all, the photometric region about the subject region including a focused, focusing region, is determined as a highest-priority region $A_{SM}$. In this case, the degree of priority PM of the highest-priority region $A_{SM}$ is set to five. Further, the focal distance of the highest-priority region $A_{SM}$ is assumed to be $DV_M$, the coordinates of the center of gravity of the highest-priority region $A_{SM}$ are assumed to be $G_M(Gx_M, Gy_M)$ and the intra-regional average brightness of the highest-priority region $A_{SM}$ is assumed to be $BV_{SM}$_ave.

Next, in regard to a photometric region $A_{Sk}$ other than the highest-priority region $A_{SM}$, various priority ratios $E_D$, $E_{DL}$, $E_G$, $E_{DB}$, $E_B$ and $E_S$ are calculated by comparison with the highest-priority region $A_{SM}$ or the like, and the degree of priority Pk of the region $A_{Sk}$ other than the highest-priority region $A_{SM}$ is sought for according to the following equation.

$$Pk = P_M \times (E_D \times E_{DL} \times E_G \times E_{DB} \times E_B \times E_S)$$

The priority ratio $E_D$ is a distance priority ratio representing whether each region is near or far from the highest-priority region $A_{SM}$ in the direction of optical axis, and the priority ratio $E_D$ is sought for by comparing the focal distance $DV_{Sk}$ of the region $A_{Sk}$ with the focal distance $D_{VM}$ of the highest-priority region $A_{SM}$. That is, the absolute value: $\Delta DV_{MK}=|DV_{Sk}-D_{VM}|$ of the focal distance between the region $A_{SK}$ and the highest-priority region $A_{SM}$ is first obtained, and the priority ratio $E_D$ is obtained from the following Table.

TABLE 1

Distance Priority Ratio: $E_D$ Calculation Table

| $\Delta DV_{MK}$ (DV) | Within 0.25 | From 0.25 to 0.5 | From 0.5 to 1.0 | Equal to Or greater than 1.0 | Focusing region not included |
|---|---|---|---|---|---|
| $E_D$ | 1.0 | 0.9 | 0.7 | 0.4 | 1.0 |

The priority ratio $E_{DL}$ is the gravity center position priority ratio representing whether each region is near or far from the highest-priority region $A_{SM}$ in the X- and Y-directions. A distance: $\Delta_L = \{(Gxk-GxM)^2+(Gyk-GyM)^2\}^{1/2}$ between the center of gravity Gk (Gxk, Gyk) of the region $A_{Sk}$ and the coordinates GM (GxM, GyM) of center of gravity of the highest-priority region $A_{SM}$ is first obtained, and then the gravity center position priority ratio $E_{DL}$ is sought for from the following Table.

TABLE 2

Gravity Center Position Priority Ratio: $E_{DL}$ Calculation Table

| $\Delta L$ | Within 10 | From 10 to 15 | From 15 to 20 | Equal to or greater than 20 |
|---|---|---|---|---|
| $E_{DL}$ | 1.0 | 0.9 | 0.7 | 0.2 |

The priority ratio $E_G$ is an absolute gravity center position ratio for reducing the degree of priority when the gravity center position of the region $A_{Sk}$ is located at an extreme upper end position of the screen. On the basis of a relation of magnitude between a gravity center coordinates Gk (Gxk, Gyk) of the region $A_{Sk}$, an X-coordinate Xmin at a left-hand end of the screen, an X-coordinate Xmax at a right-hand end of the screen, a Y-coordinate Ymax at an upper end of the screen, and a Y-coordinate Ymin at a lower end of the screen, the absolute gravity center position priority ratio $E_G$ is obtained from the following Table.

TABLE 3

Absolute Gravity Center Position Priority Ratio: $E_G$ Calculation Table

| $\Delta L$ | Gxk < Xmin + 5 | Gxk > Xmax − 5 | Gyk < Ymin + 5 | Gyk > Ymax − 5 | Other than conditions on the Left |
|---|---|---|---|---|---|
| $E_G$ | 0.1 | 0.1 | 0.1 | 0.1 | 1.0 |

The priority ratio $E_{DS}$ is a brightness priority ratio representing whether a difference in brightness relative to the highest-priority region $A_{SM}$ is great or small. The absolute value: $\Delta BV_{MK}=|BVsk\_ave-BV_{SM}\_ave|$ of a difference between intra-regional average brightness $BV_{SK}\_ave$ in the region $A_{Sk}$ and the intra-regional average brightness $BV_{SM}\_ave$ in the highest-priority region $A_{SM}$ is calculated and obtained with reference to the following Table.

TABLE 4

Brightness Priority Ratio: $E_{DB}$ Calculation Table

| $\Delta BV_{MK}$ (BV) | Within 0.5 | From 0.5 to 1.0 | From 1.0 to 2.0 | Equal to or greater than 2.0 |
|---|---|---|---|---|
| $E_{DB}$ | 1.0 | 0.9 | 0.8 | 0.6 |

The priority ratio $E_B$ is an absolute brightness priority ratio for reducing the degree of priority when the intra-regional average brightness $BV_{SK}\_ave$ in the region $A_{SK}$ has an excessively high brightness, and the priority ratio $E_B$ is sought for with reference to the following Table.

TABLE 5

Absolute Brightness Priority Ratio: $E_B$ Calculation Table

| $BV_{SK}$ ave | BV10.5 or less | BV10.5 or more |
|---|---|---|
| $E_B$ | 1.0 | 0.1 |

The priority ratio $E_S$ is a magnitude priority ratio for reducing the degree of priority when the magnitude of the region $A_{SK}$ is excessively small. From the magnitude information upon the region $A_{SK}$, namely from the number $S_K$ of pixels (the number of pixels in the C-MOS image calculating operation sensor) included in the region, the magnitude priority ratio is sought for with reference to the following Table.

TABLE 6

Magnitude Priority Ratio: $E_S$ Calculation Table

| $S_K$ | $S_K \leq 6$ | $6 < S_K \leq 10$ | $10 < S_K$ |
|---|---|---|---|
| $E_S$ | 0.2 | 0.6 | 1.0 |

By the way, $P_K$ can be equal to $P_M$. If $P_K=P_M$, then all the subject regions are to be processed with the same weight, allowing the operation to be simplified.

Next, a calculation of a ratio (hereinafter, referred to as main background occupation rate) between the main subject region and the background region, relative to a photographing region, will be described below.

Figure 25A:
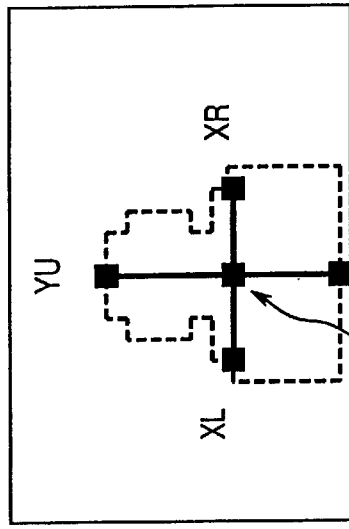
FIGS. 25(A) through 25(C) are an explanatory view showing a calculation of a main background occupation rate, if the photometric element is not employed, and if the output from the C-MOS image operation processing sensor is used as the photometric value for performing the exposure operation.
Figure 25B:
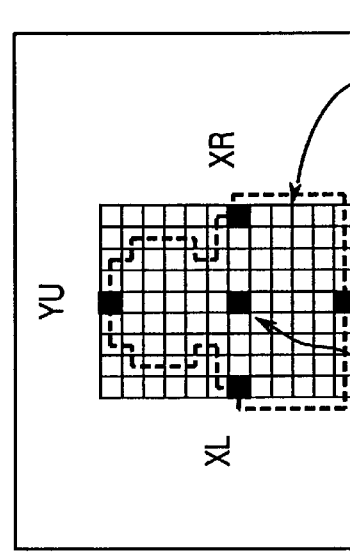
Figure 25C:
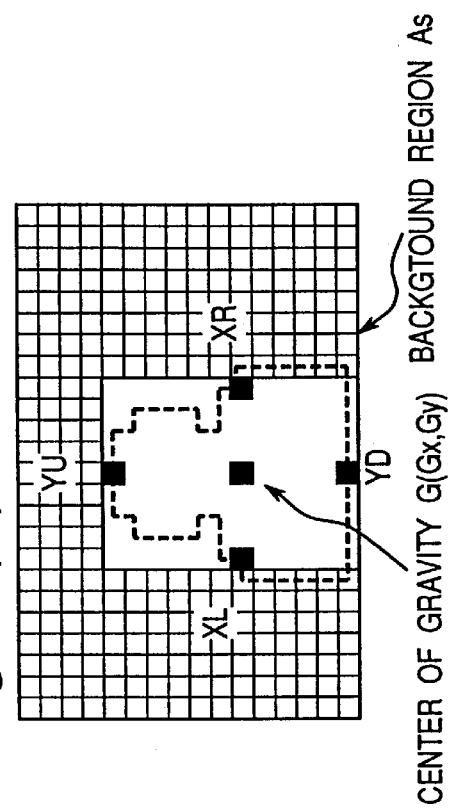
Figure 26C:
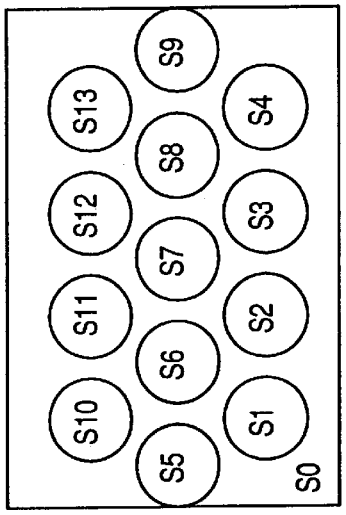
FIGS. 26(A) through 26(D) are an explanatory view showing a calculation of the main background occupation rate, if the photometric element, which is mounted independently of the C-MOS image operation processing sensor, is employed, and if the output from the photometric element is used as the photometric value for performing an exposure operation.
Figure 26B:
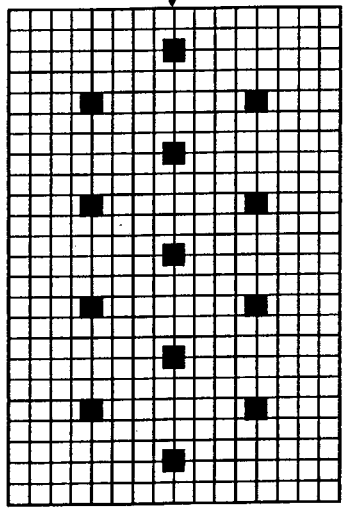
Figure 26A:
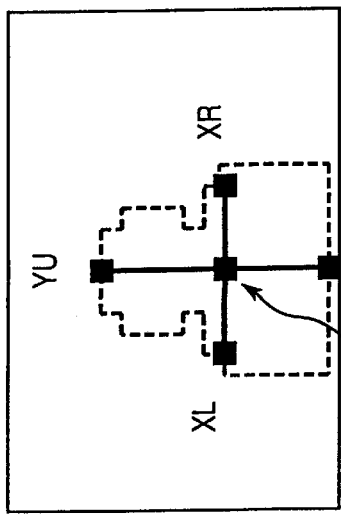
Figure 26D:
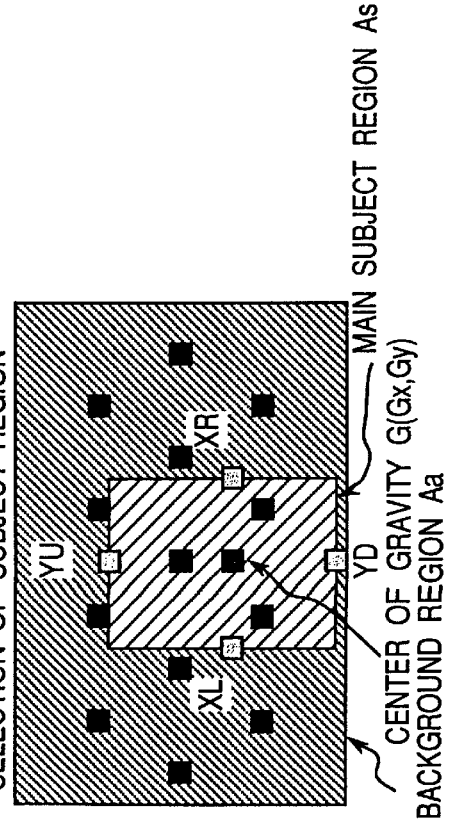

If the image data (photometric output) from the C-MOS image operation processing sensor 40*a* is directly used as the photometric value for the exposure operation as performed in the camera shown in FIG. 7 or FIG. 8, the main background occupation rate is calculated on a basis of selecting an inside of the rectangle including the edge coordinates $X_L$, $X_R$, $Y_U$ and $Y_D$ as the main subject region As as shown in FIG. 25(B), with reference to the information upon the main subject region shown in FIG. 25(A), namely with reference to the edge coordinates $X_L$, $X_R$, $Y_U$ and $Y_D$, and on a basis of selecting an outside of the rectangle including the edge coordinates $X_L$, $X_R$, $Y_U$ and $Y_D$ as the background region Aa as shown in FIG. 25(C). Then, the number of pixels Ns of the main subject region as, and the number of pixels Na of the background region Aa, are sought for, and the main background occupation rate Osa is calculated in accordance to the equation: Osa=Ns/(Ns+Na)×100(%). In the example shown in FIGS. 25(A) through 25(C), Ns=9×12=108, Na=16×24−9×12=276; therefore, Osa=108/(108+276)× 100=28.1 (%).

Meanwhile, for example, if the photometric value which is obtained by the photometric element of the photometric sensor 36 provided separately, or independently, from the C-MOS image operation processing sensor 40, is used as the photometric value for performing the exposure operation as performed in the camera shown in FIG. 4 or FIG. 5, the same procedure, or operation, is carried out. That is, as shown in FIGS. 26(A) through 26(D), an inside of the rectangle including the edge coordinates $X_L$, $X_R$, $Y_U$ and $Y_D$ in the subject region is selected as a main subject region As, and an outside of the rectangle is selected as a background region Aa. Then, the number of pixels Ns where the centers of gravity are included in the main subject region As, and the number of pixels Na where the centers of gravity are included in the background region Aa, are sought for, and the main background occupation rate Osa is calculated in accordance to the equation: Osa=Ns/(Ns+Na)×100(%). In the example shown in FIGS. 26(A) through 26(D), Osa=3/ (3+10)×100=23 (%)

Next, a fundamental operation of the camera with the mechanism for controlling the flash light emission according to the preferred embodiment will be described below, with reference to the flowcharts of FIG. 27 through FIG. 36.

Figure 27:
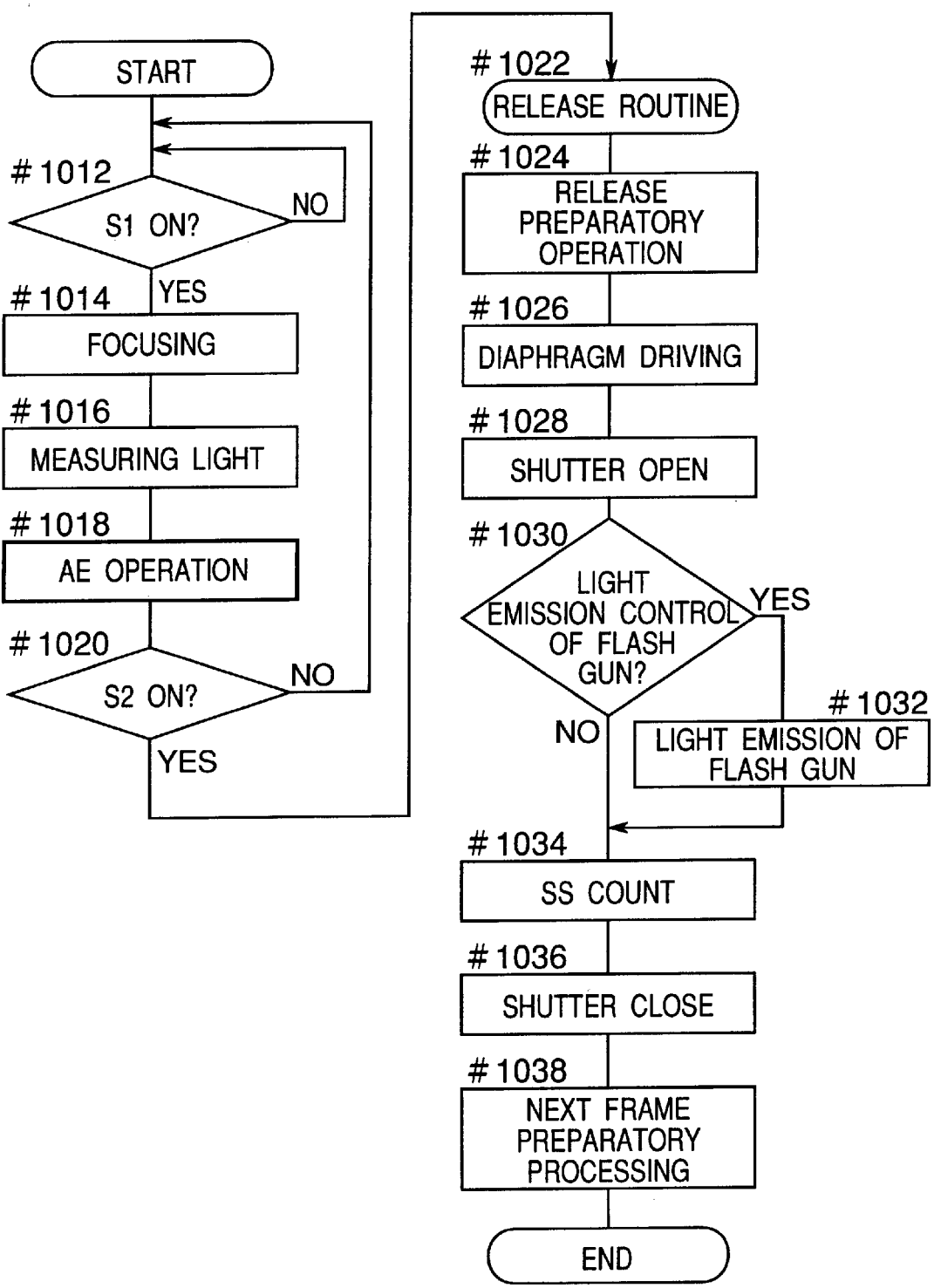
FIG. 27 is a fundamental flowchart showing a general operation of the camera with the mechanism for controlling the flash light emission according to the preferred embodiment of the present invention.

That is, first referring to FIG. 27, it is determined in step #1012 whether or not the switch S1 is turned on, in which the switch S1 is turned on when the shutter button is pressed down halfway. If the switch S1 is turned on, then a focusing operation is executed in step #1014, and a photometry (i.e. photometric measuring) is executed in step #1016. Each piece of data, output in each of steps #1014 and #1016, is stored into the memory.

Next, an AE operation (described in more detail, later) is executed in step #1018, in which an exposure condition (a presence or an absence of flash light, an aperture AV, a shutter speed TV), and so on, is determined. Next, the aforementioned steps #1012 through #1018 are repeated until the shutter button is completely depressed to turn on the switch S2.

If the switch S2 is turned on, then a release routine in steps #1022 through step #1038 is executed.

That is, in step #1024, a release preparatory operation, such as a mirror up, a shutter charge, and so on, is executed, and then in step #1026, a diaphragm (an aperture) is driven so as to achieve an aperture AV which has been determined in step #1018. Then, in step #1028, the shutter is opened, and the exposure is started. In this stage, a light is emitted from the flash gun if necessary, through steps #1030 and #1032.

Next, in step #1034, the shutter speed is counted, and in step #1036, the shutter is closed when the shutter speed TV reaches a speed which has been determined in step #1018, and then the exposure is terminated. Then, the program proceeds to step #1038 in which a next frame preparation processing, such as a mirror down, a film feeding by one frame, and so on, is executed.

Figure 28:
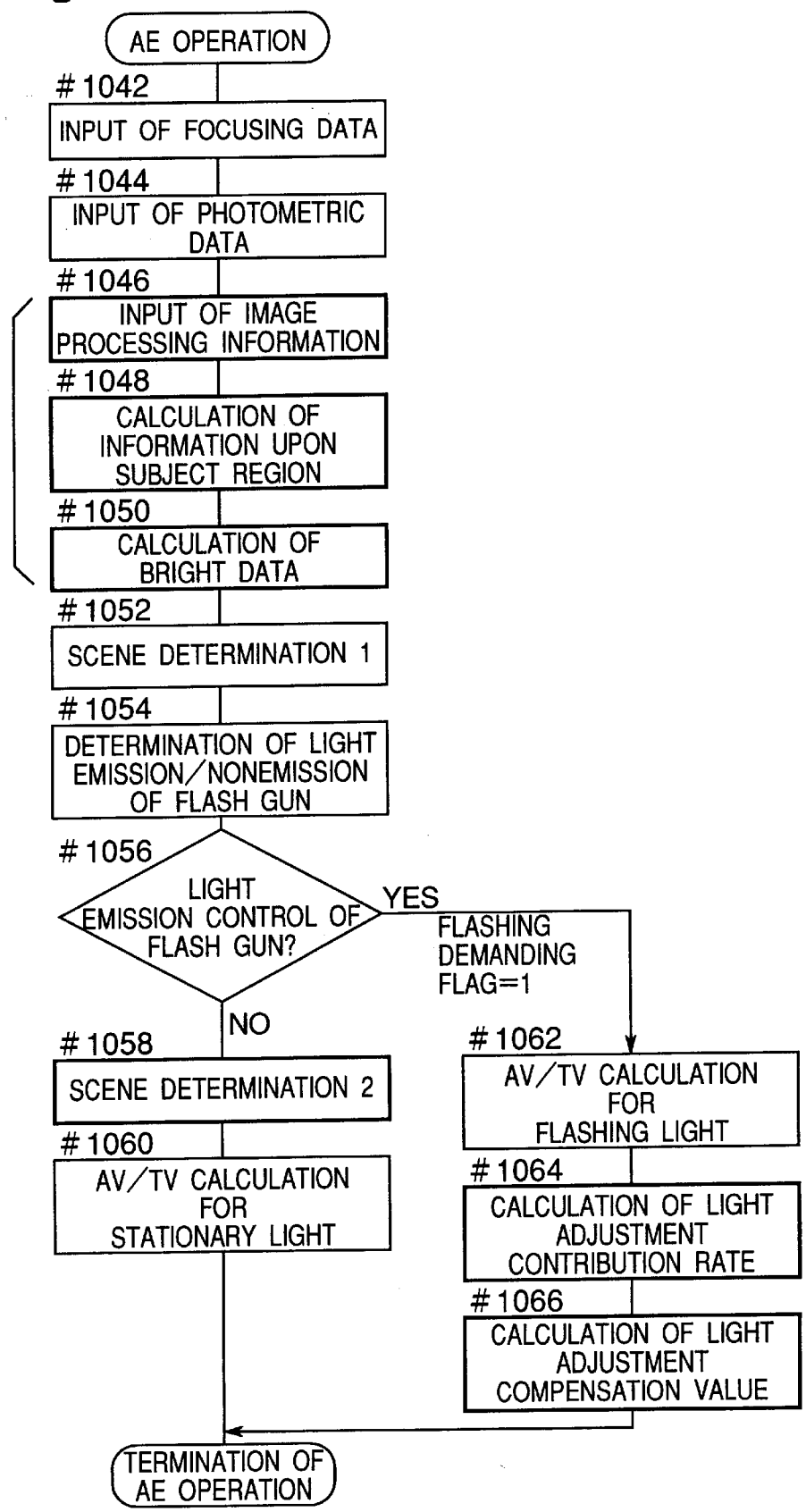
FIG. 28 is a detailed flowchart of step #1018 of FIG. 27.

The AE operation in step #1018 in FIG. 27 will be described below in more detail, with reference to a detailed flowchart of FIG. 28.

That is, in step #1042, the control microcomputer 30 reads the focusing data, which has been measured in step #1014, from the memory, and, in step #1044, the control microcomputer 30 reads the photometric data, which has been measured in step #1016, from the memory.

Next, in step #1046, the control microcomputer 30 receives an input of the image processing information from the image operation processing sensor 40, calculates the information upon subject region in step #1048 on the basis of the image processing information, and calculates the main subject brightness and the background brightness in step #1050.

Next, a process of scene determination 1 ("SCENE DETERMINATION 1") is executed in step #1052 as described in detail later, and it is determined in step #1054 whether or not light emission from the flash gun is necessary. Then, it is determined in step #1056 whether or not flash light emission control is necessary.

If the flash light emission control is not executed, then a process of scene determination 2 ("SCENE DETERMINATION 2") is executed in step #1058 as described later. Next, the aperture AV for the stationary light control and the shutter speed TV are calculated in step #1060, and the process for performing the AE operation comes to an end.

On the other hand, if it is determined in step #1056 that the flash light emission control of the flash gun is performed, a flash emission demanding flag is set to one, and then the aperture AV for the flash light control and the shutter speed TV are calculated in step #1062. Next, as described in detail later, a light adjustment contribution rate is calculated in step #1064, a light adjustment compensation value is calculated in step #1066, and the process for performing the AE operation comes to an end.

Figure 29:
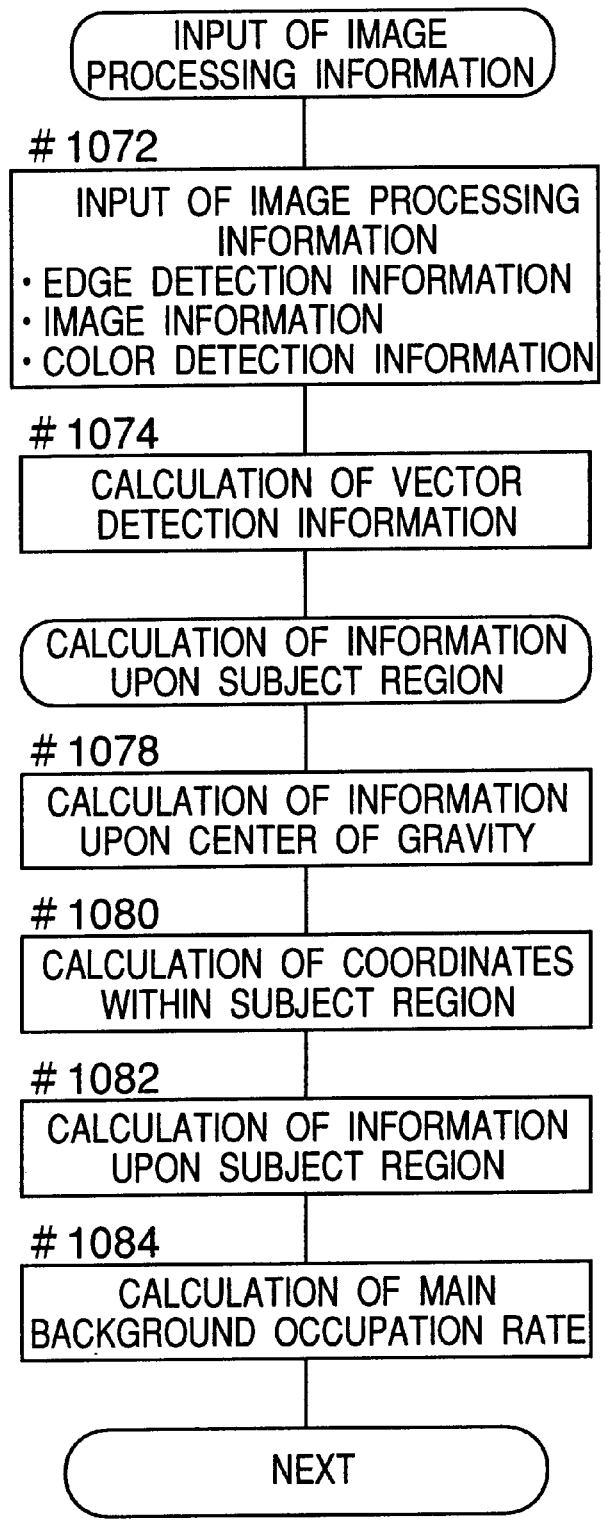
FIG. 29 is a detailed flowchart of steps #1046 and #1048 of FIG. 28.

The aforementioned steps #1046 and #1048 will be described in more detail below, with reference to a detailed flowchart of FIG. 29.

First, an image processing information input routine in step #1072 and its subsequent steps is executed.

That is, in step #1072, the control microcomputer 30 receives an input of the image processing information, such as the edge-detecting information, image information and color information, from the image operation processing sensor 40, and it stores the information into the memory. The control microcomputer 30 further receives, in step #1074, an input of a vector Vn which is obtained by calculating a difference between frames by the image operation processing sensor 40.

Next, the control microcomputer 30 executes a routine for calculating the information upon subject region, in step #1076 and its subsequent steps.

That is, in step #1078, centers of gravity $G_1, G_2, \ldots, G_k$ are obtained for each series of edges. Next, in step #1080, edge coordinates $XL_j$, $XR_j$, $YU_j$ and $YD_j$ in which the X-coordinate or the Y-coordinate is equal to that of the center of gravity $G_j$, are obtained for each series of edges $(j=1, 2, \ldots, k)$.

Next, the information upon subject region is calculated in step #1082. That is, each region surrounded by a series of edges is, respectively, set as the main subject region $As_j$ ($j=1, 2, \ldots, k$), and other regions are set as the background region Aa. Then, the average brightness within the region, size information and the degree of priority, are obtained per each region.

More specifically, the average brightness $BVs_{j\_ave}$ ($j=1, 2, \ldots, k$) within the region of the main subject region $As_j$ is the average value of photometric outputs $BVAs_j1$, $BVAs_j2, \ldots, BVAs_jn_j$ of the pixels located inside the main subject regions $As_j$ (assuming that there are $n_j$ pixels in total). The average brightness $BVa\_ave$ within the region of the background region Aa is the average value of photometric outputs $BVAa1, BVAa2, \ldots, BVAam$ of the pixels in the region that is included in neither one of the main subject regions $As_j$ (assuming that there are m pixels in total). Size information $S_j$ of the main subject region $As_j$ is the number of pixels $n_j$ ($j=1, 2, \ldots, k$) included in the main subject region $As_j$.

BY the way, the size information $S_j$ may be obtained from the sizes $Lx_j$ and $Ly_j$ in the X- and Y-directions of each main subject region $As_j$, according to the equation: $S_j = Lx_j \times Ly_j$ ($j=1, 2, \ldots, k$). The degree of priority $P_j$ of each main subject region $As_j$ is sought, on a basis of information upon distance (information upon the most proximity), information upon size (number of pixels), a region located around the center, a region having the highest brightness (contra-rear light), a region having the lowest brightness (rear light), or the like. It is also acceptable to set all the degrees of priority equal to one another, with the arrangement of which an equivalent average photometric state is realized to allow the operation to be simplified.

Next, a main background occupation rate Osa is calculated in step #1084. The main background occupation rate Osa is calculated according to the equation: $Osa = Nk/(Nk+m) \times 100$ (%) from the total $Nk = n_1 + n_2 + \ldots + n_k$ of the number of pixels $n_j$ of each main subject region $As_j$ and from the number of pixels m of the background region Aa.

By the way, in the aforementioned steps #1078 through #1084, a series of edges may be grouped, or classified, by using the color information (i.e. information upon color) and the vector information (information upon vector), and then it may be processed in the manner similar to the manner as aformentioned.

Next, the calculation of the brightness data in the aforementioned step #1050 of FIG. 28 will be described in more detail below, with reference to a detailed flowchart of FIG. 30.

That is, in step #1090, a weighted average of the intra-regional average brightness values $BVs_{j\_ave}$ (i.e. average brightness values $BVs_{j\_ave}$ within the region) of each main subject regions $As_j$ is obtained by making use of the degree of priority $P_j$, and the main subject brightness reference data BVS is calculated. That is, the calculation is executed according to the equation: $BVS = (P_1 \times n_1 \times BVs_{1\_ave} + P_2 \times n_2 \times BVs_{2\_ave} + \ldots + P_k \times n_k \times BVs_{k\_ave})/(P_1 \times n_1 + P_2 \times n_2 + \ldots + P_k \times n_k)$.

Next, in step #1092, the intra-regional average brightness $BVa\_ave$ of the background region Aa obtained in step #1082 is set as the background brightness reference data BVA within the background region.

Figure 31:
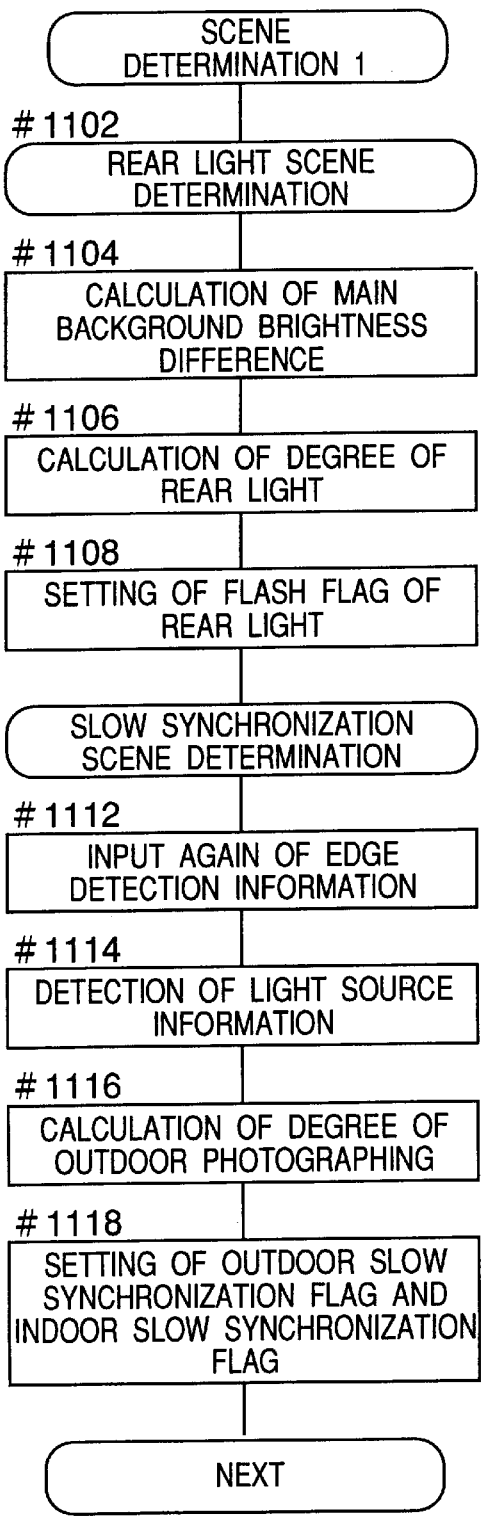
FIG. 31 is a detailed flowchart of step #1052 of FIG. 28.

Next, the scene determination 1 in the aforementioned step #1052 of FIG. 28 will be described in more detail below, with reference to a detailed flowchart of FIG. 31.

First, a rear light scene determination routine in step #1102 and its subsequent steps is executed.

That is, a main background brightness difference $\Delta BAsa = BVS - BVA$ is calculated in step #1104. Next, in step #1106 a degree of rear light $D_{BL}$ is calculated using the following Table (TABLE 7) from the main background brightness difference $\Delta BAsa$ and the main background occupation rate Osa.

TABLE 7

Degree of Rear Light: $D_{BL}$ Calculation Table

| Osa | ΔBvsa | | | |
|---|---|---|---|---|
| | Less than −3 | from −3 to −1.5 | from −1.5 to −0.5 | −0.5 or more |
| Less than 15% | 30 | 20 | 10 | 0 |
| from 15 to 40% | 90 | 60 | 30 | 20 |
| from 40 to 70% | 100 | 80 | 50 | 20 |
| 70% or more | 50 | 40 | 15 | 0 |

Next, a rear light flash flag BLFL_F is set in step #1108. Specifically, if there is a relation: $BVA > BV7.5$ and $D_{BL} > 65$, then an equation BLFL_F=1 is set; on the other hand, if there is not the above relation, then an equation BLFL_F=0 is set. Into this arrangement, may be incorporated image magnification information (i.e. information upon image magnification).

Next, a slow synchronization scene determination routine in step #1110 and its subsequent steps is executed.

First, in step #1112, edge-detecting information is inputted again. Next, light source information is detected in step #1114. Specifically, the information of which the edge brightness difference is not smaller than a specified value (BV8, for example) among the edge-detecting information is extracted. If the size information $S_K$ is used, then the number $S_K$ of pixels, satisfying a relation of $S_K > 10$ pixels (provisional), out of the regions surrounded by the detected edges, is set as an indoor light source number: $n_{in}$, and the number $S_K$ of pixels, satisfying a relation of $S_K \leq 10$ pixels (provisional), is set as an outdoor light source number: $n_{out}$.

If the color information is used, then the number $S_K$ of pixels, that satisfies a relation of $S_K > 10$ pixels and that satisfies a condition in which the ratio of G is not smaller than a specified value (0.5, for example) in terms of the ratios of R, G and B (1.0 in total), out of the regions surrounded by the detected edges, is set as an indoor light source number: $n_{in}$ (corresponding to the number of detected fluorescent lamps), and the number of pixels other than the above number $S_K$ of pixels is set as an outdoor light source number: $n_{out}$.

Next, in step #1116, a degree of outdoor photographing Dout is calculated from the indoor light source number $n_{in}$ and the outdoor light source number $n_{out}$ with reference to the following Table.

TABLE 8

Degree of Outdoor Photographing: Dout Calculation Table

| | nin | | | |
|---|---|---|---|---|
| n out | 0 | from 1 to 2 | from 3 to 4 | 5 or More |
| 0 | 50 | 20 | 10 | 0 |
| from 1 to 3 | 70 | 50 | 40 | 10 |
| from 4 to 6 | 90 | 60 | 50 | 30 |
| 7 or More | 100 | 80 | 70 | 50 |

Next, in step #1118, an outdoor slow synchronization flag SLOWOUT_F and an indoor slow synchronization flag SLOWIN_F are set. It is assumed that SLOWOUT_F=1 if both BVA<BV2 and Dout>65 are satisfied; meawhile, it is assumed that SLOWOUT_F=0 if BVA<BV2 and Dout>65 are not satisfied. Also, it is assumed that SLOWIN_F=1 if both BV2<BVA<BV6 and Dout>35 are satisfied; meawhile, it is assumed that SLOWIN_F=0 if BV2≦BVA<BV6 and Dout>35 are not satisfied.

Figure 32:
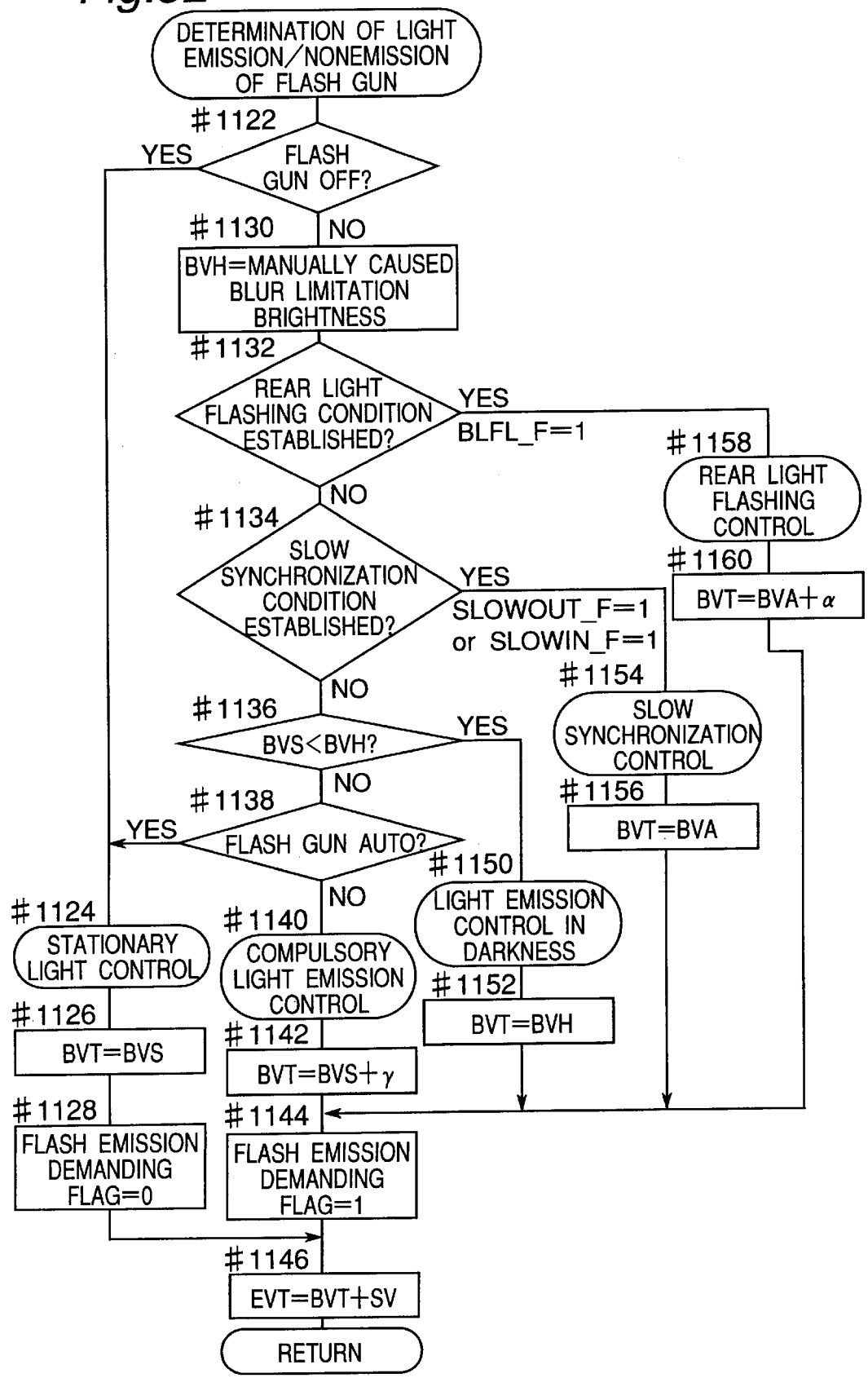
FIG. 32 is a detailed flowchart of step #1054 of FIG. 28.

Next, a determination of light emission/non-emission of flash gun in the aforementioned step #1054 of FIG. 28 will be described in more detail below, with reference to a detailed flowchart of FIG. 32.

First, it is determined in step #1122 whether or not the flash gun is off.

If the flash gun is off, then a stationary light control routine in step #1124 and its subsequent steps is executed.

Figure 30:
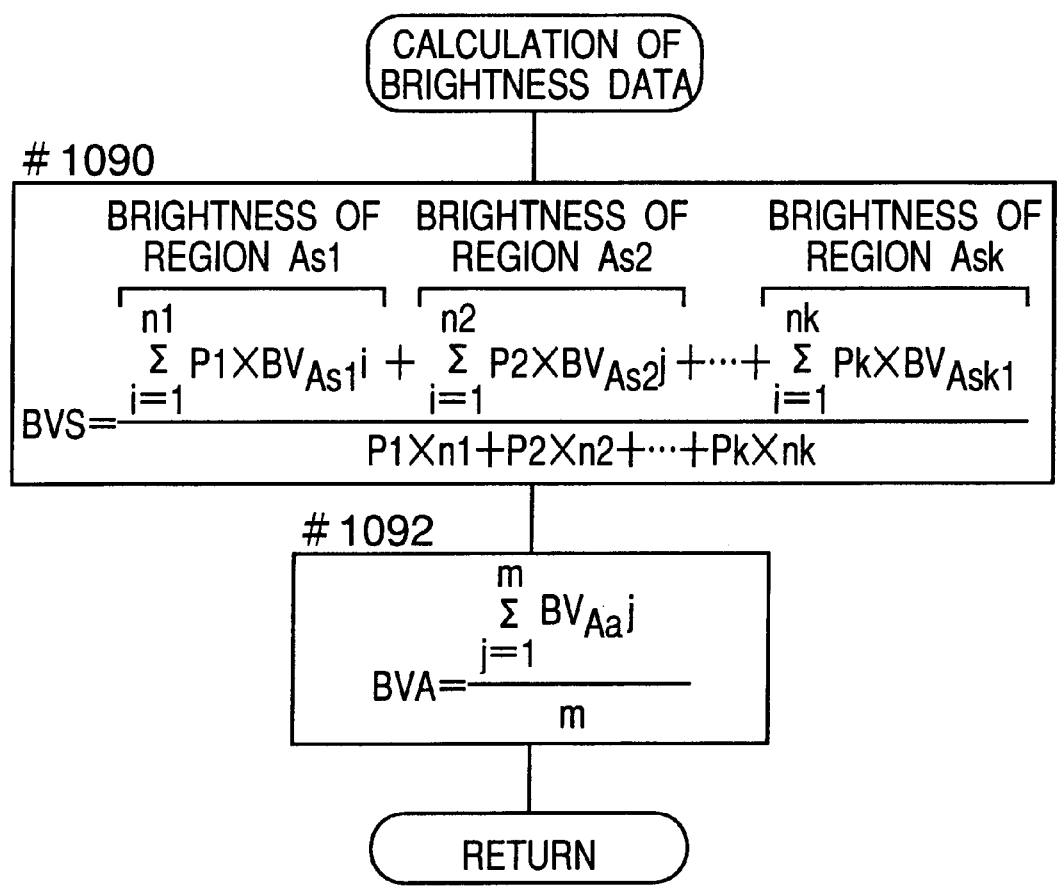
FIG. 30 is a detailed flowchart of step #1050 of FIG. 28.

That is, BVT is made to be the main subject brightness reference data BVS obtained in the aforementioned step #1090 of FIG. 30, and a flash emission demanding flag is set to zero in step #1128. Then, SV is added to BVT to gain EVT (i.e. EVT=BVT+SV) in step #1146, and the program is returned.

On the other hand, if it is determined in step #1122 that the flash gun is on, then the value of BVH is set to a manually caused blur limitation brightness in step #1130, and it is determined in step #1132 whether or not a rear light flashing condition is established.

If the rear light flashing condition is established, namely if BLFL_F=1, then a rear light flashing control routine in step #1158 and its subsequent steps is executed.

That is, in step #1160, α is added to the background brightness reference data BVA obtained in the aforementioned step #1092 of FIG. 30 to gain BVT (i.e. BVT=BVA+α), and the flash emission demanding flag is set to 1 in step #1144. Thereafter, the aforementioned step #1146 is executed, and the program is returned.

On the other hand, it is determined in step #1132 that the rear light flashing condition is not established, then the program proceeds to step #1134 in which it is determined whether or not the slow synchronization condition is established.

If the slow synchronization condition is established, namely if SLOWOUT_F=1 or SLOWIN_F=1, then a slow synchronization control routine in step #1154 and its subsequent steps is executed.

That is, in step #1156, BVT is made to be equal to BVA, the aforementioned steps #1144 and #1146 are executed, and then the program is returned.

On the other hand, if it is determined in step #1134 that the slow synchronization condition is not established, then the program proceeds to step #1136 in which it is determined whether or not BVS is smaller than BVH.

If BVS is smaller than BVH, then a routine of a light emission control in darkness in step #1150 and its subsequent steps is executed.

That is, BVT is made to be equal to BVH in step #1152, the aforementioned steps #1144 and #1146 are excuted, and then the program is returned.

On the other hand, if it is determined in step #1136 that BVS is not smaller than BVH, the program proceeds to step #1138 in which it is determined whether or not the flash gun is automatically operated. If the flash gun is automatic, then the stationary light control routine in the aforementioned step #1124 and its subsequent steps is executed.

On the other hand, if the flash gun is not automatic, then a compulsory light emission control routine in step #1140 and its subsequent steps is executed. That is, γ is added to BVS to make BVT in step #1142, the aforementioned steps #1144 and #1146 are performed, and then the program is returned.

Figure 33:
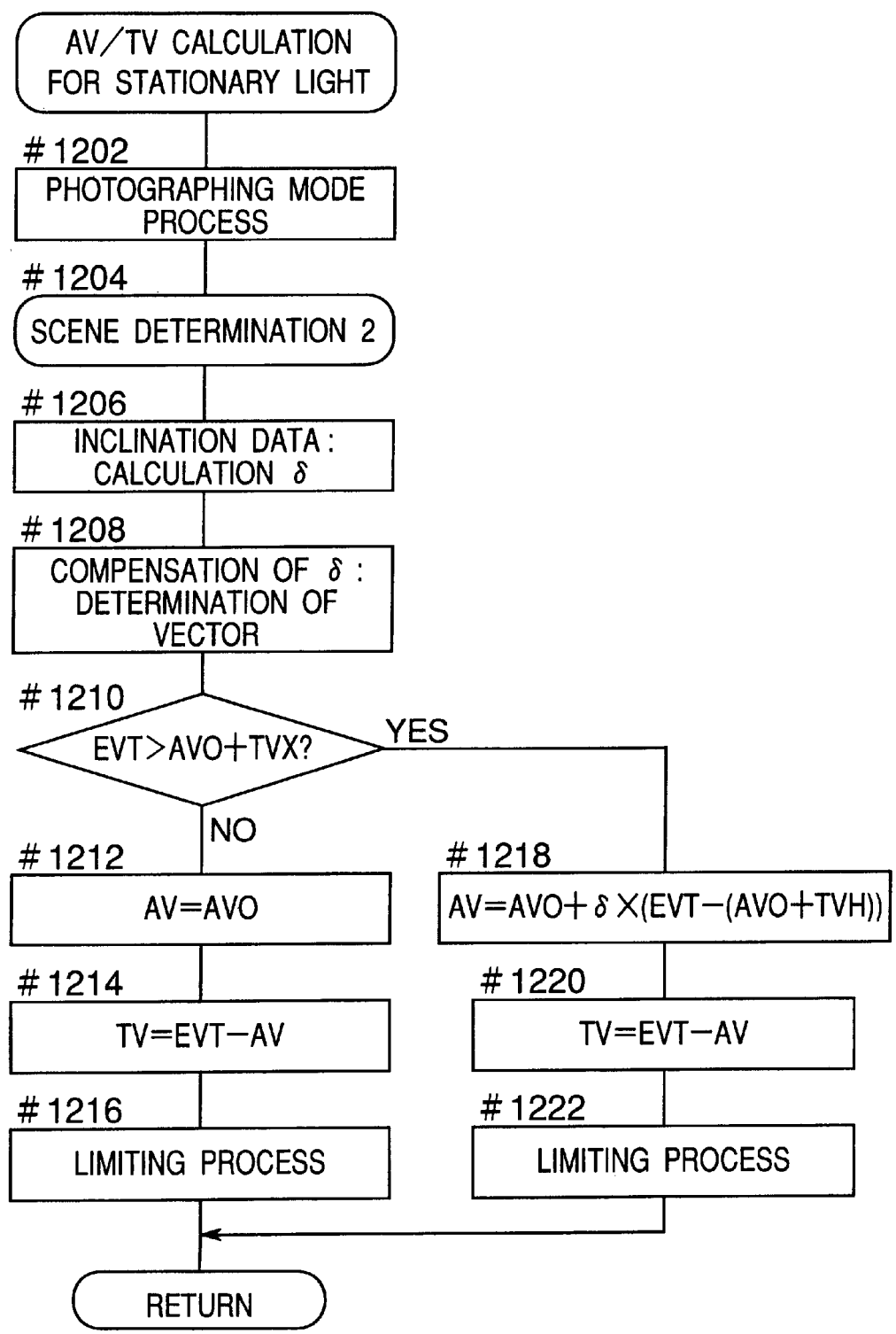
FIG. 33 is a detailed flowchart of step #1060 of FIG. 28.

Next, a calculation of the aperture AV and a calculation of the shutter speed TV, at time of the stationary light control as shown in step #1160 of FIG. 28, will be described in more detail below, with reference to a detailed flowchart of FIG. 33.

That is, in step #1202, a photographing mode process is executed and then a routine of a scene determination 2 ("SCENE DETERMINATION 2") in step #1204 and its subsequent steps is executed.

That is, an inclination δ is calculated in step #1206. The inclination δ can be any value which is equal to or more than zero (0) and which is equal to or less than one (1). When δ is greater, the aperture is made narrower, and the shutter speed is set to be slower (lower). Meanwhile, when δ is smaller, the aperture is made wider, and the shutter speed is set to be higher.

The inclination δ is obtained from a focal length f1 and the main background occupation rate Osa, according to the following δ calculation Table (TABLE 9).

TABLE 9

δ Calculation Table (Example 1) (If Focal Length (f1) Is Used)

| | F1 | | | |
|---|---|---|---|---|
| Osa | Less than 35 mm | from 35 to 50 mm | From 50 to 85 mm | 85 mm or More |
| Less than 15% | 1.0 | 0.9 | 0.7 | 0.6 |
| from 15 to 35% | 0.9 | 0.8 | 0.6 | 0.5 |
| from 35 to 60% | 0.6 | 0.6 | 0.3 | 0.2 |
| from 60 to 80% | 0.4 | 0.3 | 0.2 | 0.1 |
| 80% or More | 0.6 | 0.5 | 0.6 | 0.7 |

Alternatively, the inclination δ may be obtained from an image magnification ratio β and the main background occupation rate Osa, according to the following δ calculation Table (TABLE 10).

TABLE 10

δ Calculation Table (Example 2)
(If Image Magnification Ratio (β) Is Used)

| Osa | β | | | | |
|---|---|---|---|---|---|
| | 1/10 or More | From 1/10 to 1/40 | from 1/40 to 1/70 | from 1/70 to 1/100 | Less than 1/100 |
| Less than 15% | 0.7 | 0.6 | 0.4 | 0.6 | 1.0 |
| from 15 to 35% | 0.6 | 0.5 | 0.3 | 0.6 | 1.0 |
| from 35 to 60% | 0.5 | 0.4 | 0.1 | 0.3 | 0.9 |
| from 60 to 80% | 0.6 | 0.3 | 0.2 | 0.2 | 0.8 |
| 80% or More | 0.7 | 0.5 | 0.3 | 0.3 | 0.7 |

By the way, focal length information (information upon the focal distance) may be incorporated into this Table.

Next, in step #1208, the inclination δ is corrected, or compensated, on the basis of vector detecting information Vn. That is, if Vn>Cv, then the value of δ is made to be one half. In this case, Cv is a constant, and Cv=1 mm/cm on the screen, for example. With this setting, if the vector detecting information Vn is higher than a specified value Cn, then it is assumed that the subject is a moving object or a sports scene, and δ is shifted to the high-speed side.

Next, it is determined in step #1210 whether or not EVT is greater than the sum of AVO and TVH. In this case, AVO is a reference aperture, and TVH is a manually caused blur limitation shutter speed.

If EVT is greater than the sum of AVO and TVH, then the aperture: AV=AVO+δ×(EVT−(AVO+TVH)) is calculated in step #1218. Then, in step #1220, AV is subtracted from EVT to set the shutter speed TV. Then, finally, a limitation process is executed in step #1222, and the program is returned.

On the other hand, if it is determined in step #1210 that EVT is not greater than the sum of AVO and TVH, then the program proceeds to step #1212 in which the reference aperture AVO is made to be equal to AV in step #1212, and then AV is subtracted from EVT to determine the shutter speed TV. Then, finally, a limitation process is executed in step #1216, and then the program is returned.

Figure 34:
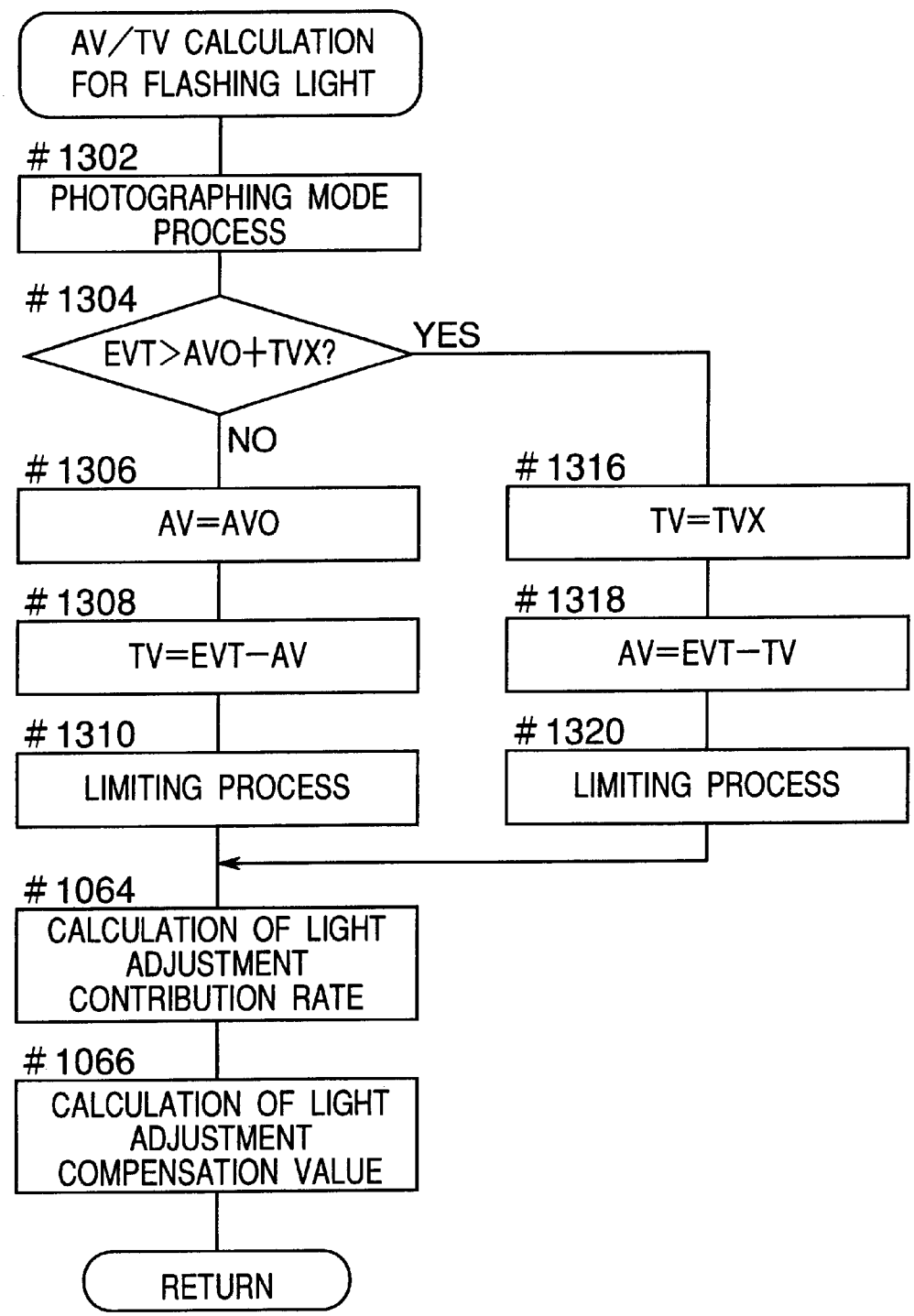
FIG. 34 is a detailed flowchart of step #1062 of FIG. 28.

Next, a calculation of the aperture AV and a calculation of the shutter speed TV, at time of the flash light control as shown in the aforementioned step #1062 of FIG. 28, will be described below in more detail, with reference to a detailed flowchart of FIG. 34.

That is, in step #1302, a photographing mode process is executed, and it is determined in step #1304 whether or not EVT is greater than the sum of AVO and TVX (flash synchronization shutter speed).

If EVT is greater than the sum of AVO and TVX, then TVX is made to be equal to the shutter speed TV in step #1316, TV is subtracted from EVT to determine the aperture AV in step #1318, and a limitation process is executed in step #1320.

On the other hand, if it is determined in step #1304 that EVT is not greater than the sum of AVO and TVX, then the program proceeds to step #1306 in which the reference aperture AVO is made to be equal to the aperture AV, a value obtained by subtracting AV from EVT is set as the shutter speed TV in step #1308, and a limitation process is executed in step #1310.

After the limitation process in step #1310 or #1320 is performed, the light adjustment contribution rate is calculated in step #1064 as described above, and the light adjustment compensation value is calculated in step #1066.

Next, these steps #1064 and #1066 will be further described in more detail below.

Figure 35:
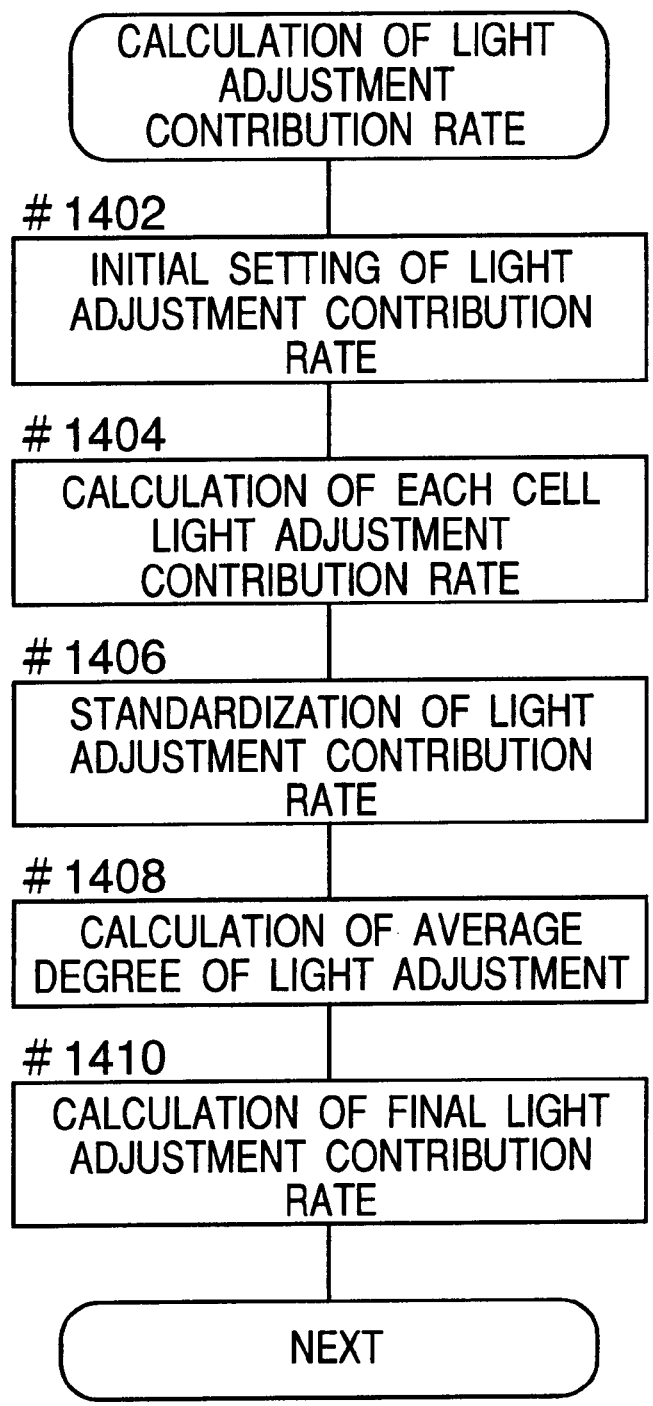
FIG. 35 is a detailed flowchart of step #1064 of FIG. 34.

First, a calculation of the light adjustment contribution rate in the aforementioned step #1064 of FIG. 34, will be described, with reference to a detailed flowchart of FIG. 35.

That is, in step #1402, a weight (contribution rate) wt (wt0, wt1, . . . , wtn) of each light adjustment cell C0, C1, . . . , Cn is set to zero as an initial value.

Next, in step #1404, the light adjustment contribution rate of each cell is calculated in step #1404. The information upon region (i.e. coordinates) of each light adjustment cell is of a predetermined value that is known beforehand. In this step, it is determined whether or not there exist(s) a center of gravity Gk of the main subject region $A_{SK}$, and/or the number j of intra-regional coordinates $X_{LK}$, $X_{RK}$, $Y_{UK}$ and $Y_{DK}$ in the main subject region $A_{SK}$, within the region per each light adjustment cell Cn. And, in this step, if there exist(s), each of the numbers is checked (or sought for). Further, if the center of gravity $G_K$ of the region $A_{SK}$ exists, then the information SK upon size of the region $A_{SK}$, and the degree of priority Pk of the region $A_{SK}$, are checked. Then, the contribution rate wtn" of each cell is sought for, in accordance with the following equation:

$$wtn''=R1\times(Pk1\times S_K1+Pk2\times S_K2+\ldots+Pki\times S_Ki)+R2\times j$$

where R1 and R2 are constants (R1=R2=1, for example).

Next, a light adjustment contribution rate wtn' is standardized in step #1406, according to the following equation:

$$wtn'=8\times wtn''/\max(wt1'',\ldots,wtm'')$$

With this standardization, the maximum contribution rate (weight) can be standardized as 8, and this contribution rate (weight) becomes the final control weight in the multi-division light adjustment.

Next, an average degree of light adjustment Dave is calculated in step #1408, from a distance D (unit: meter) up to the subject, and from the main background occupation rate Osa, on a basis of the following Table (TABLE 11).

TABLE 11

Dave Calculation Table

| Osa | D (m) | | | | |
|---|---|---|---|---|---|
| | Smaller than 1 m | from 1 to 2 m | from 2 to 4 m | from 4 to 8 m | 8 m or More |
| Less than 15% | 80 | 90 | 90 | 100 | 100 |
| from 15 to 35% | 50 | 60 | 80 | 90 | 100 |
| from 35 to 60% | 30 | 20 | 10 | 0 | 10 |
| from 60 to 80% | 50 | 10 | 0 | 10 | 20 |
| 80% or More | 60 | 50 | 30 | 40 | 50 |

This average degree of light adjustment Dave is for the purpose of setting to an average contribution rate when the main background occupation rate Osa is low.

Next, in step #1410, the final light adjustment contribution rate wtn of each light adjustment cell Cn is calculated according to the following equation:

$$wtn=(Dave\times 8+(100-Dave)\times wtn')/100.$$

The final light adjustment contribution rate wtn can be any value which is equal to or more than zero, and which is equal to or less than 8.

Figure 36:
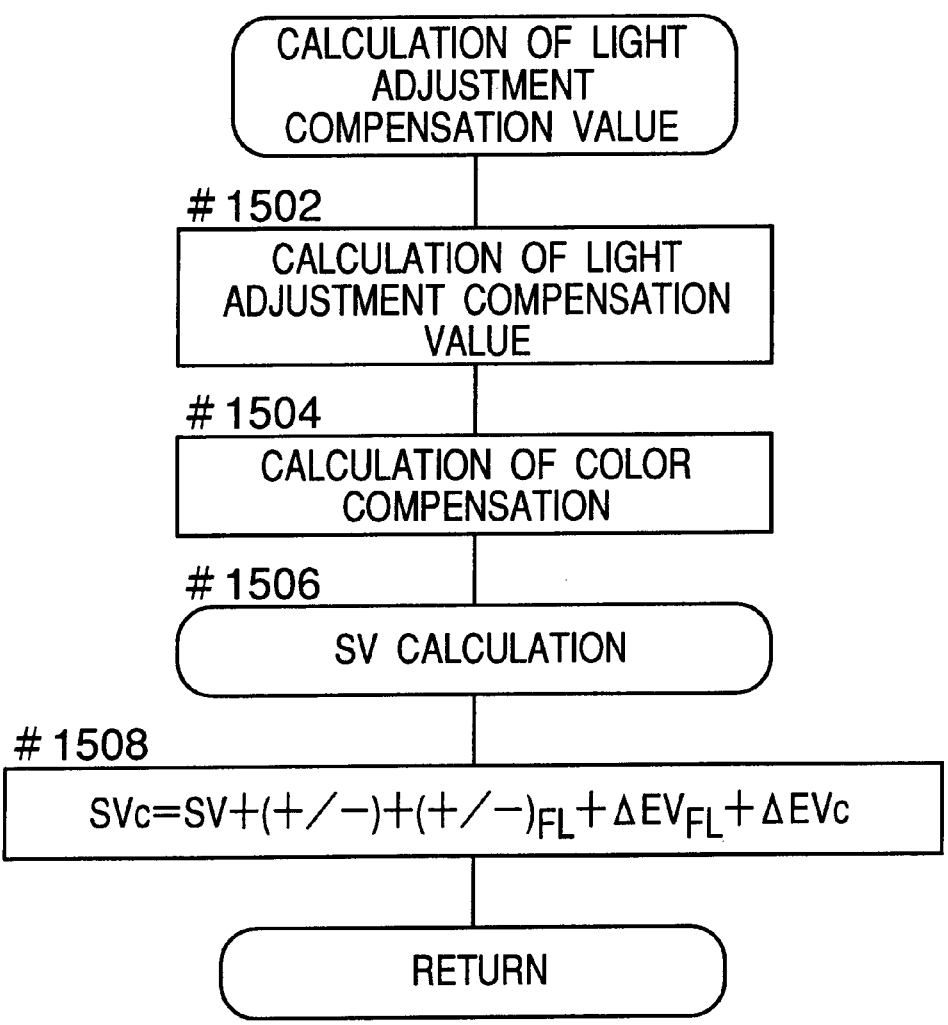
FIG. 36 is a detailed flowchart of step #1066 of FIGS. 28 and 34.
Figure 37:
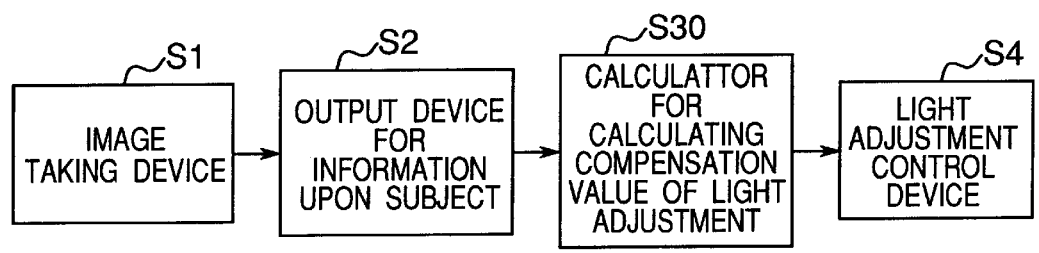
FIG. 37 is a schematic diagram of the camera with the mechanism for controlling the flash light emission according to a third aspect of the present invention.
Figure 38:
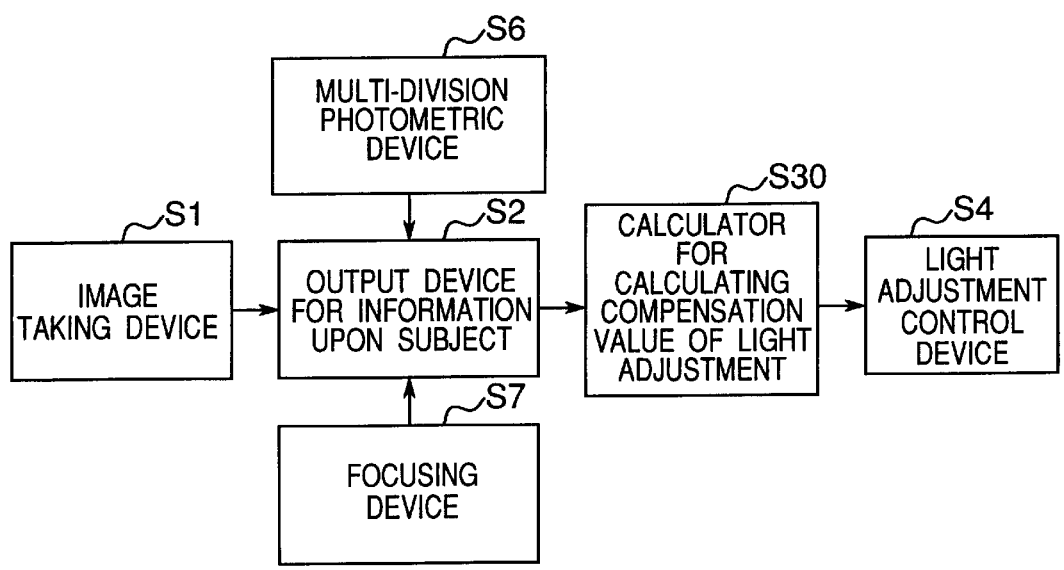
FIG. 38 is a schematic diagram of the camera with the mechanism for controlling the flash light emission according to a fourth aspect of the present invention.
Figure 39:
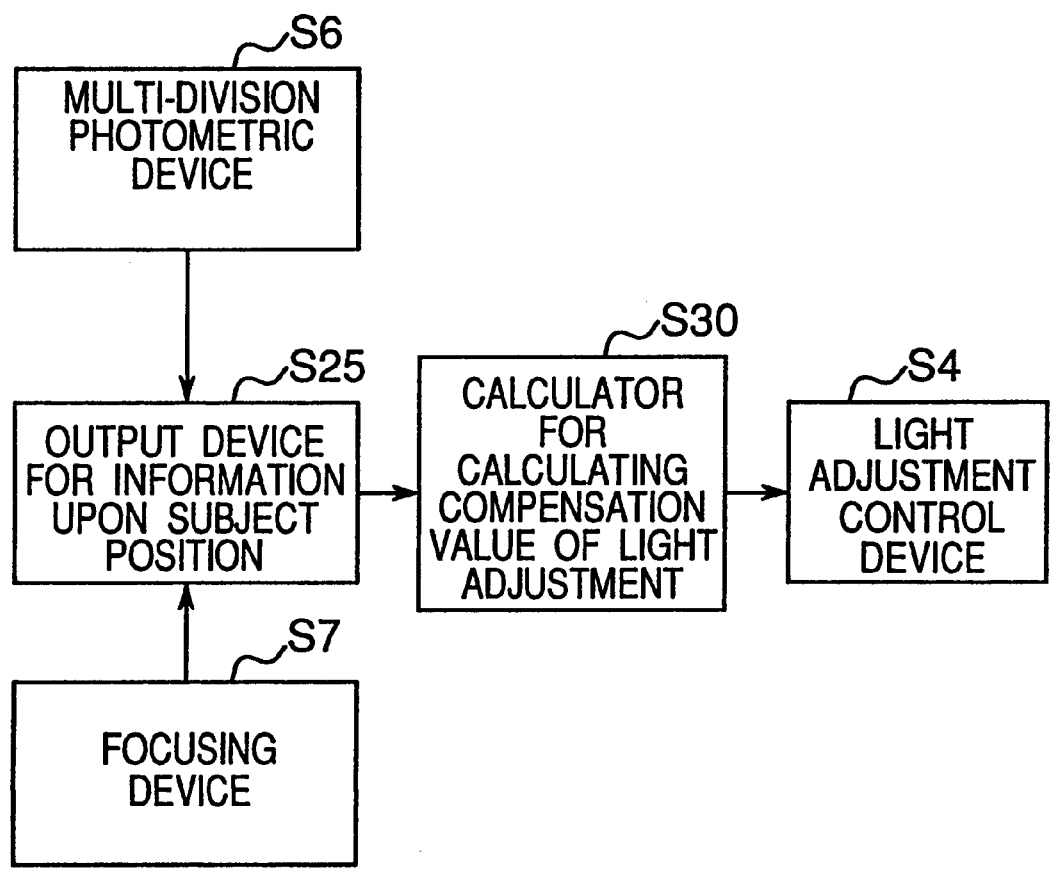
FIG. 39 is a schematic diagram of a camera with a mechanism for controlling a flash light emission according to a prior art.

Next, a routine of a light adjustment compensation value calculation in the aforementioned step #1066 of FIG. 28 and FIG. 34, will be described in more detail below, with reference to a detailed flowchart of FIG. 36.

In step #1502, a light adjustment compensation value $\Delta EV_{FL}$ is calculated from the distance D up to the subject and from the main background occupation rate Osa, in accordance with the following Table (TABLE 12).

TABLE 12

$\Delta EV_{FL}$ Calculation Table (Unit: EV)

| | D (m) | | | | |
|---|---|---|---|---|---|
| OSa | Smaller than 1 m | From 1 to 2 m | from 2 to 4 m | from 4 to 8 m | 8 m or More |
| Less than 15% | 1.0 | 1.3 | 1.5 | 1.5 | 1.2 |
| from 15 to 35% | 0.7 | 1.0 | 1.2 | 1.0 | 0.8 |
| from 35 to 60% | 0.6 | 0.5 | 0.7 | 0.7 | 0.5 |
| from 60 to 80% | 0.4 | 0.2 | 0.3 | 0.3 | 0.4 |
| 80% or More | 0.5 | 0.0 | 0.0 | 0.1 | 0.2 |

Next, in step #1504, a color compensation $\Delta EVc$ is calculated from the ratios of R, G and B, in accordance with the following Table (TABLE 13). It is to be noted that $\Delta EVc$ is calculated, only when color information can be obtained.

TABLE 13

$\Delta EVc$ Calculation Table

| | G/R | | | |
|---|---|---|---|---|
| B/R | Less than 0.3 | from 0.3 to 1 | from 1 to 2 | 2 or More |
| Less than 0.3 | 0 | −0.2 | 0.5 | 0.7 |
| from 0.3 to 1 | −0.2 | −0.8 | 0.4 | 0.6 |
| from 1 to 2 | 0.5 | 0.4 | 0.2 | 0.5 |
| 2 or More | 0.7 | 0.6 | 0.5 | 0.4 |

Next, in step #1506, a speed value SV of a setting film is calculated. Next, a control film speed value SVc is calculated in step #1508 in accordance with the following equation, and then the program is returned.

$$SVc = SV + (+/-) + (+/-)_{FL} + \Delta EV_{FL} + \Delta EVc$$

where (+/−) represents an exposure compensation value which is set by the user, and $(+/-)_{FL}$ represents a light adjustment compensation value which is set by the user.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera, comprising:
   an image sensor for sensing an image of a subject to be photographed, and for outputting subject information by processing data of the image;
   a plurality of light adjustment sensors for receiving a light which reflects from the subject, wherein each of the light adjustment sensors has a light receiving region which corresponds to at least a part of the light, and wherein the light adjustment sensors receive the light when a flash light is emitted;
   a calculator for calculating a contribution rate of an output supplied from each of the light adjustment sensors, on a basis of the subject information output from the image sensor; and
   a controller for controlling an emission of the flash light, on a basis of the contribution rate calculated by the calculator.

2. The camera as claimed in claim 1, which further comprises a distance detecting sensor for measuring a distance up to the subject, and for outputting focusing information,
   wherein the calculator calculates the contribution rate of the output on the basis of the subject information output from the image sensor and on a basis of the focusing information output from the distance detecting sensor.

3. The camera as claimed in claim 1, which further comprises a light measuring sensor for optically measuring a brightness of the subject, and for outputting a photometric value of the brightness thereof,
   wherein the calculator calculates the contribution rate on the basis of the subject information output from the image sensor and on a basis of the photometric value output from the light measuring sensor.

4. The camera as claimed in claim 1, which further comprises a discriminator for discriminating information upon a main subject region from the subject information,
   wherein the calculator calculates the contribution rate on a basis of the information upon the main subject region.

5. The camera as claimed in claim 4, wherein the calculator increases the contribution rate of the output supplied from at least one light adjustment sensor having the light receiving region which generally corresponds to the main subject region.

6. The camera as claimed in claim 5, wherein the calculator increases the contribution rate of the output supplied from at least one light adjustment sensor having the light receiving region, which generally corresponds to the main subject region and which generally corresponds to a region that is focussed.

7. The camera as claimed in claim 1, wherein the image sensor detects at least one of:
   (1) a contour of the subject;
   (2) a speed and a direction of movement of the subject; and
   (3) a color of the subject,
   wherein the image sensor outputs the subject information, on a basis of information upon the at least one thereof the image sensor detects.

8. The camera as claimed in claim 1, wherein the image sensor is constituted by a single element which comprises:
   a light receiving part; and
   an image processing part.

9. A method for controlling an emission of flash light, by making use of an image sensor for detecting an image-of a subject to be photographed and for outputting subject information by processing data of the image, comprising the steps of:
   receiving a light which reflects from the subject by a plurality of light adjustment sensors, wherein each of the light adjustment sensors has a light receiving region which corresponds to at least a part of the light, and wherein the light adjustment sensors receive the light when the flash light is emitted;
   calculating a contribution rate of an output supplied from each of the light adjustment sensors, on a basis of the subject information which is output from the image sensor; and controlling the emission of flash light, on a basis of the contribution rate thus calculated.

10. A camera, comprising:

an image sensor for sensing an image of a subject to be photographed, and for outputting subject information by processing data of the image;

a calculator for calculating a compensation value for light adjustment, on a basis of the subject information output from the image sensor; and a controller for controlling an emission of a flash light, on a basis of the compensation value for light adjustment calculated by the calculator.

11. The camera as claimed in claim 10, which further comprises a discriminator for discriminating information upon a main subject region from the subject information and for discriminating information upon a background region from the subject information, wherein the calculator calculates the compensation value for light adjustment on a basis of the information upon the main subject region and the information upon the background region.

12. The camera as claimed in claim 11, wherein the calculator calculates the compensation value for light adjustment in accordance with a proportion of the main subject region to the background region.

13. The camera as claimed in claim 10, which further comprises a distance detecting sensor for measuring a distance up to the subject, and for outputting focusing information, wherein the calculator calculates the compensation value for light adjustment, on the basis of the subject information output from the image sensor and on a basis of the focusing information output from the distance detecting sensor.

14. The camera as claimed in claim 10, which further comprises a light measuring sensor for optically measuring a brightness of the subject, and for outputting a photometric value of the brightness thereof, wherein the calculator calculates the compensation value for light adjustment, on the basis of the subject information output from the image sensor and on a basis of the photometric value output from the light measuring sensor.

15. The camera as claimed in claim 10, wherein the image sensor detects at least one of:

(1) a contour of the subject;

(2) a speed and a direction of movement of the subject; and (3) a color of the subject, wherein the image sensor outputs the subject information, on a basis of information upon the at least one thereof the image sensor detects.

16. The camera as claimed in claim 10, wherein the image sensor is constituted by a single element which comprises:

a light receiving part; and an image processing part.

17. A method for controlling an emission of flash light, by making use of an image sensor for detecting an image of a subject to be photographed and for outputting subject information by processing data of the image, comprising the steps of:

calculating a compensation value for light adjustment on a basis of the subject information which is output from the image sensor; and controlling the emission of flash light, on a basis of the compensation value for light adjustment thus calculated.

* * * * *